(12) United States Patent
Sugiura et al.

(10) Patent No.: US 8,702,953 B2
(45) Date of Patent: Apr. 22, 2014

(54) METHOD OF DETERMINING OPERATING CONDITION FOR ROTARY SURFACE TREATING APPARATUS

(75) Inventors: Yutaka Sugiura, Osaka (JP); Masanobu Morita, Osaka (JP)

(73) Assignee: C. Uyemura & Co., Ltd., Osaka (JP)

( * ) Notice: Subject to any disclaimer, the term of this patent is extended or adjusted under 35 U.S.C. 154(b) by 773 days.

(21) Appl. No.: 12/516,269

(22) PCT Filed: Dec. 28, 2006

(86) PCT No.: PCT/JP2006/326231
§ 371 (c)(1),
(2), (4) Date: May 26, 2009

(87) PCT Pub. No.: WO2008/081536
PCT Pub. Date: Jul. 10, 2008

(65) Prior Publication Data
US 2009/0301888 A1    Dec. 10, 2009

(51) Int. Cl.
*C25D 21/12* (2006.01)
*C25D 17/16* (2006.01)

(52) U.S. Cl.
USPC .............. 205/82; 205/81; 205/143; 204/212

(58) Field of Classification Search
USPC .................................................... 205/82, 81
See application file for complete search history.

(56) References Cited

U.S. PATENT DOCUMENTS

| | | | | |
|---|---|---|---|---|
| 5,487,824 A * | 1/1996 | Griego | ........................... | 205/128 |
| 5,698,081 A * | 12/1997 | Lashmore et al. | ............. | 204/212 |
| 5,726,361 A * | 3/1998 | Ogawa | ........................... | 73/663 |
| 6,287,444 B1 * | 9/2001 | Nishiuchi et al. | ............. | 205/128 |
| 6,562,217 B1 * | 5/2003 | Tanaka et al. | ................. | 205/143 |
| 6,890,412 B2 * | 5/2005 | Griego et al. | ................... | 205/89 |
| 2004/0031693 A1 * | 2/2004 | Chen et al. | ..................... | 205/123 |
| 2005/0227381 A1 * | 10/2005 | Cao et al. | ......................... | 438/14 |
| 2007/0284244 A1 * | 12/2007 | Davidson | ..................... | 204/274 |

FOREIGN PATENT DOCUMENTS

| | | |
|---|---|---|
| JP | 7-118896 | 5/1995 |
| JP | 8-239799 | 9/1996 |
| JP | 9-31697 | 2/1997 |
| JP | 9-137289 | 5/1997 |
| JP | 2005-325406 | 11/2005 |
| JP | 2006-37184 | 2/2006 |
| JP | 2006-45619 | 2/2006 |

OTHER PUBLICATIONS

"Medialess High Efficiency Electroplating of SMT Discrete Device Terminations" by Minogue et al. pp. 288-291 accessed online at http://ecadigitallibrary.com/ (published 2005).*

(Continued)

*Primary Examiner* — Bryan D. Ripa
(74) *Attorney, Agent, or Firm* — Hamre, Schumann, Mueller & Larson, P.C.

(57) ABSTRACT

It is an object of the present invention to derive the optimum operating condition parameters for plating operation accurately and efficiently. At first, a preliminary test operation is carried out under the energized condition (S12), then in light of such result, a sequential operations such as a first test operation (step S14) in which no energization is carried out for plurality of operating pattern candidates and a second test operation (step S16) under the energized condition are carried out, and then the optimum operating conditions are registered (step S18).

10 Claims, 18 Drawing Sheets

(56) References Cited

OTHER PUBLICATIONS

First Notification of Office Action issued in corresponding Chinese Application No. 200680056813.6, issued May 10, 2010, with an English translation—7 pages.

2nd Notification of Office Action issued in corresponding Chinese Application No. 200680056813.6, issued Oct. 8, 2010, with an English translation—6 pages.

Notification of Reason for Refusal issued in Japanese Patent Application No. 2008-551996 and mailed Jul. 23, 2012, with an English translation—4 pages.

Taiwanese Office Action issued in counterpart Taiwanese application No. 095149738, mailed Feb. 21, 2013, 11 pages and its English translation, 7 pages.

Notification of Reasons for Refusal, Korean Intellectual Property Office, mailed Aug. 20, 2013, 12 pages—with English Translation.

* cited by examiner

FIG.6

Operating condition parameters
(Preliminary test operation)

| Type of treatment object | No. | Direction 1=Forward and Reverse 2=Forward only (d0) | Acceleration period 1~2 (d1) | Number of rotation 1~7 (d6) | Plating delay period *.*s (d2) | Plating period *.*s (d3) | Deceleration period 1~2 (d4) | Quiescent period *.*s (d5) |
|---|---|---|---|---|---|---|---|---|
| Cubic component (such as chip capacitor, chip register) | 1 | 1 | 1 | 3 | 2.0 | 4.0 | 2 | 1.0 |
| Powder (e.g. ball for BGA in 0.1mm~ several mm such as copper, plastic) | 2 | 1 | 2 | 5 | 1.0 | 3.0 | 1 | 0.0 |
|  | 3 |  |  |  |  |  |  |  |
|  | 4 |  |  |  |  |  |  |  |
|  | 5 |  |  |  |  |  |  |  |
|  | 6 |  |  |  |  |  |  |  |
|  | 7 |  |  |  |  |  |  |  |
|  | 8 |  |  |  |  |  |  |  |
|  | 9 |  |  |  |  |  |  |  |
|  | 10 |  |  |  |  |  |  |  |

| Electric charge for plating[AS] (d7) | Electric current for plating[A] (d8) | Number of cycle (d10) |
|---|---|---|
| 200 | 5 | 10 |

PN1

| Speed-1 | 5.00 | Hz |
| Speed-2 | 10.00 | Hz |
| Speed-3 | 20.00 | Hz |
| Speed-4 | 30.00 | Hz |
| Speed-5 | 40.00 | Hz |
| Speed-6 | 50.00 | Hz |
| Speed-7 | 60.00 | Hz |
| Acceleration-1 | 1.0 | sec |
| Deceleration-1 | 0.5 | sec |
| Acceleration-2 | 4.0 | sec |
| Deceleration-2 | 2.0 | sec |

Pattern No.1

[Determine]

200

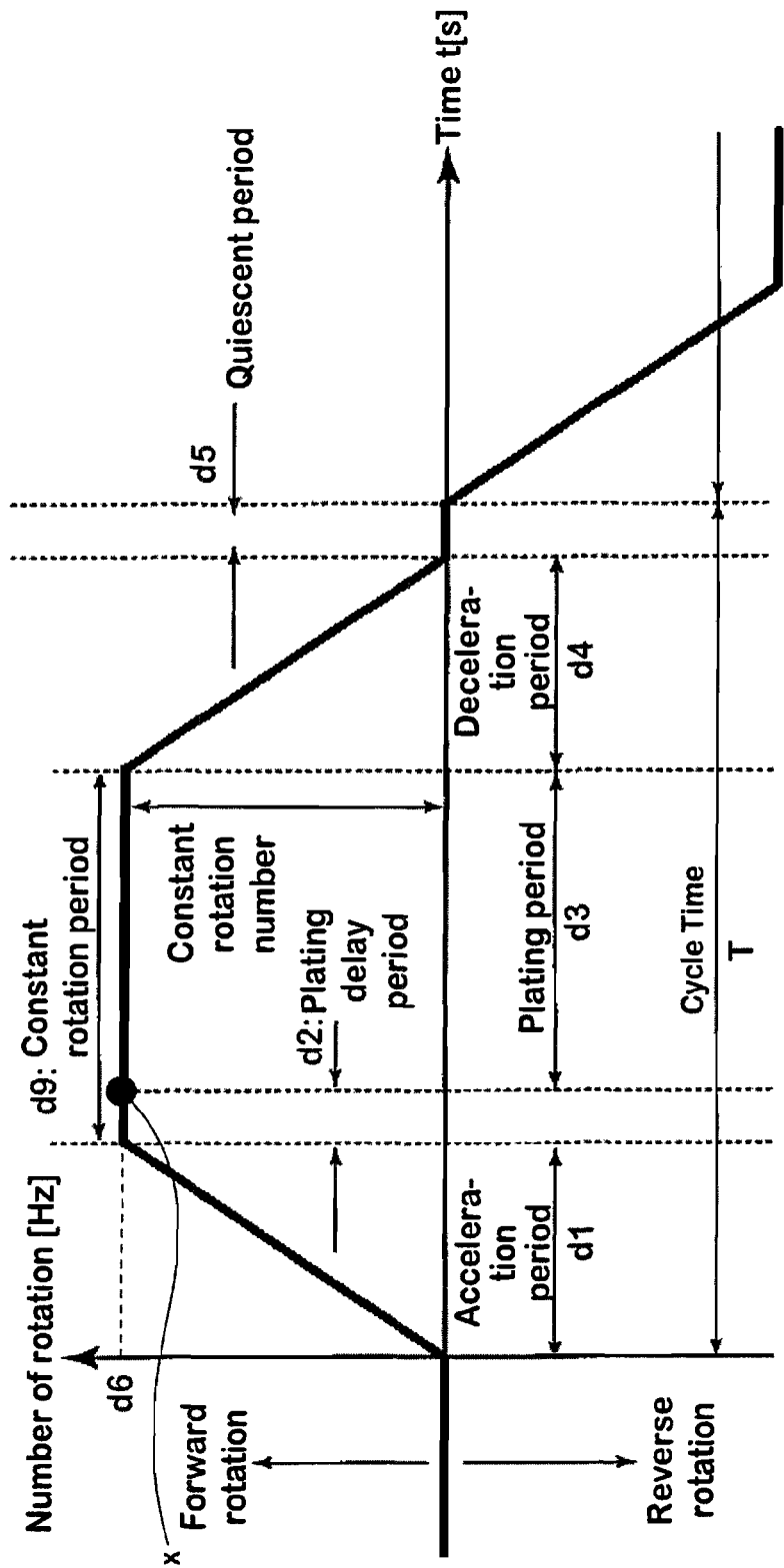

FIG.9
Operating condition parameters
(First test operation)

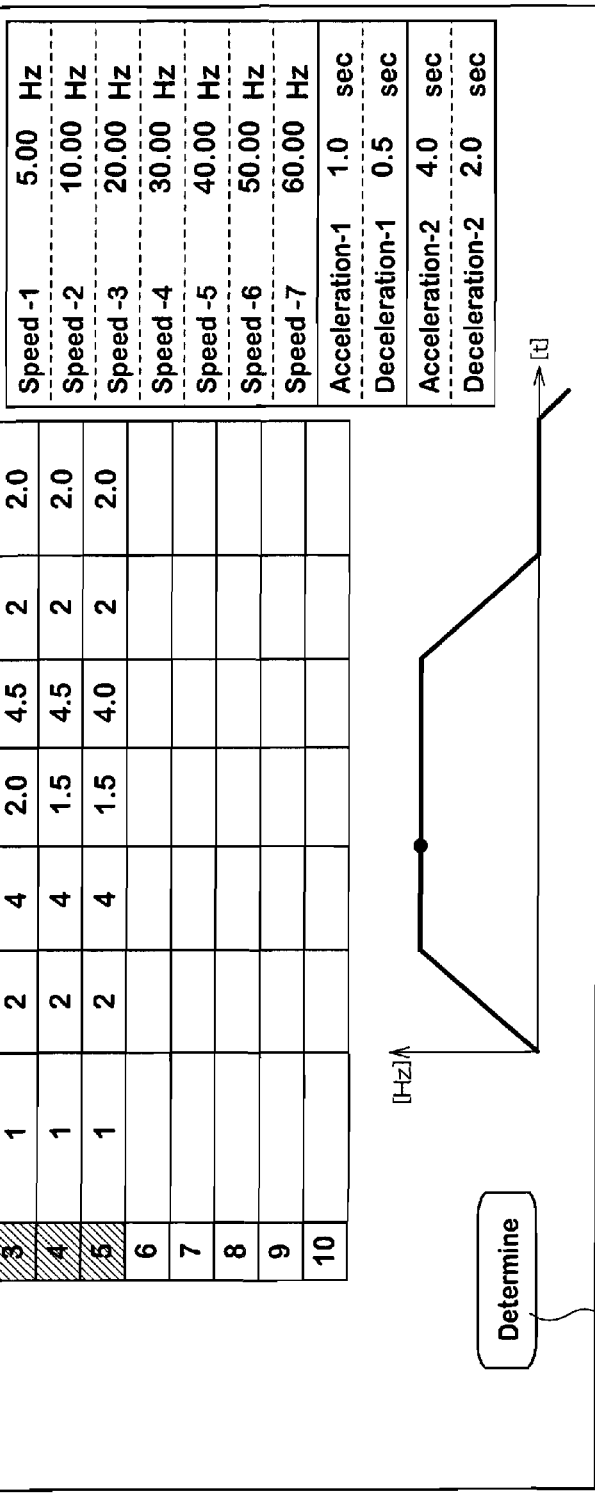

| No. | Direction 1=Forward and Reverse 2= Forward only | Acceleration period 1~2 | Number of rotation 1~7 | Plating delay period *.*s | Plating period *.*s | Deceleration period 1~2 | Quiescent period *.*s |
|---|---|---|---|---|---|---|---|
| | d0 | d1 | d6 | d2 | d3 | d4 | d5 |
| 1 | 1 | 2 | 4 | 2.0 | 4.0 | 2 | 1.5 |
| 2 | 1 | 2 | 4 | 2.0 | 4.0 | 2 | 1.5 |
| 3 | 1 | 2 | 4 | 2.0 | 4.5 | 2 | 2.0 |
| 4 | 1 | 2 | 4 | 1.5 | 4.5 | 2 | 2.0 |
| 5 | 1 | 2 | 4 | 1.5 | 4.0 | 2 | 2.0 |
| 6 | | | | | | | |
| 7 | | | | | | | |
| 8 | | | | | | | |
| 9 | | | | | | | |
| 10 | | | | | | | |

| | | |
|---|---|---|
| Speed-1 | 5.00 | Hz |
| Speed-2 | 10.00 | Hz |
| Speed-3 | 20.00 | Hz |
| Speed-4 | 30.00 | Hz |
| Speed-5 | 40.00 | Hz |
| Speed-6 | 50.00 | Hz |
| Speed-7 | 60.00 | Hz |
| Acceleration-1 | 1.0 | sec |
| Deceleration-1 | 0.5 | sec |
| Acceleration-2 | 4.0 | sec |
| Deceleration-2 | 2.0 | sec |

Determine — 202

FIG.18

| Type of treatment object | No. | Direction 1=Forward and Reverse 2= Forward only | Acceleration period 1~2 | Number of rotation 1~7 | Plating delay period *.*s | Plating period *.*s | Deceleration period 1~2 | Quiescent period *.*s |
|---|---|---|---|---|---|---|---|---|
| Cubic component (such as chip capacitor, chip register) | 1 | 1 | 1 | 3 | 2.0 | 4.0 | 2 | 1.0 |
| Powder (e.g. ball for BGA in 0.1mm~ several mm such as copper, plastic) | 2 | 1 | 2 | 5 | 1.0 | 3.0 | 1 | 0.0 |
| | -- | -- | -- | -- | -- | -- | -- | -- |

| | Value | Unit |
|---|---|---|
| Speed -1 | 5.00 | Hz |
| Speed -2 | 10.00 | Hz |
| Speed -3 | 20.00 | Hz |
| Speed -4 | 30.00 | Hz |
| Speed -5 | 40.00 | Hz |
| Speed -6 | 50.00 | Hz |
| Speed -7 | 60.00 | Hz |
| Acceleration-1 | 1.0 | sec |
| Deceleration-1 | 0.5 | sec |
| Acceleration-2 | 4.0 | sec |
| Deceleration-2 | 2.0 | sec |

METHOD OF DETERMINING OPERATING CONDITION FOR ROTARY SURFACE TREATING APPARATUS

TECHNICAL FIELD

The present invention relates to a rotary surface treating apparatus for carrying out plating treatment to a fine treatment object, specifically, a technology for determining operating conditions for performing desired plating treatment to the treatment object.

BACKGROUND ART

Conventionally, rotary surface treating apparatuses have been used as tools for conducting high-quality plating on fine components (small elements) illustrated in FIG. 15 (patent documents 1 through 4).

In other words, a rotary surface treating apparatus comprises a rotatable treatment container having a solution outflow part on at least a part of circumference thereof and having a cathode on the circumference thereof, a dome part surrounding the treatment container and an anode inserted from an upper opening of the container, wherein the following steps such as surface treatment solution and the treatment object are housed in the container, the treatment object is pushed so as to cover a cathode with the treatment object as a result of centrifugal force caused by rotating such container while providing the surface treatment solution, the surface treatment solution is splattered from the solution outflow part and is collected within the dome part, and thereby the surface treatment solution within the container is updated.

The apparatus is used under the condition of energizing the anode and the cathode while supplying plating solution as the surface treatment solution when plating is carried out on a treatment object, and that is used under the condition of supplying into the container the surface treatment solution such as cleaning water and pre-treatment solution without carrying out energization when washing and pre-treatment are carried out.

FIG. 15 are diagrams illustrating examples of small elements that become the object of plating treatment on the rotary surface treating apparatus in which plated portions are illustrated in dashed lines EP1 to EP3. FIG. 15A shows a chip capacitor made of rectangular shaped ceramics and both ends thereof being plated (EP1). FIG. 15B is an enlarged partial cross sectional view of a particle of plating powder for double plated (EP2, EP3) BGA on the surface of powdered material (plastic material and steel product) having diameter 0.1 to several mm.

In order to carry out uniform thick plating on a desired portion of a relatively small treatment object, it is suitable to make the treatment object under the condition of moving the object toward the circumference direction by rotating the container housing the plating solution and the object therein and to carry out electroplating by energizing between the anode disposed on the center of the container and the cathode arranged on the circumference direction under the previous condition.

General mechanisms of rotary plating treatment carried out in the rotary surface treating apparatus will be described in below using FIG. 16.

As shown in FIG. 16, a Plating treatment part that carries out rotary plating treatment comprises a treatment container T0 having circular cathodes N0 and is attached to a rotation drive shaft S0, an anode P0 immersed in plating solution, a dome part R0 collecting the plating solution splattered from a solution outflow part H0. The anode P0 is arranged such that it is immersed in the plating solution at the center of the circularly formed container T0, and plating treatment is carried out by energizing under the condition of covering the circular cathode with treatment objects W that are moved toward the circumference direction by rotating the container as shown in FIG. 16. Since fine pores or slits impenetrable to the objects W are formed on the solution outflow part H0 with porous-rings, channels, washers and the like, immersed plating solution is always splattered circumferentially, but such solution is collected by the dome part R0 and feedbacks to the container T0 (refilled from a solution supply pipe Q0 of an upper opening Z0), so that the plating solution within the container always circulates.

The container not only rotates in forward direction, but also repeatedly rotating in the reverse direction, decelerating its speed and stopping its rotation for stirring the treatment objects, thereby uniform plating quality can be achieved.

FIG. 17 shows a series of operation in the plating treatment. FIG. 17 is a flow chart of each treatment in the plating treatment. As shown in FIG. 17, in electroplating treatment, plating accustomization operation S02, plating operation S04 and plate dewatering operation S08 are carried out, and then washing accustomization operation S09, washing operation S10 and washing dewaterization operation S11 are carried out in that order as treatments for washing the objects W and the container T0. Alternatively, further washing treatment may be carried out prior to the plating accustomization operation S02. As shown in FIG. 17, defoaming operation S06 may appropriately be carried out during the plating operation S04.

The plate accustomization operation S02 shown in FIG. 17 is carried out in order to accustom the objects W to the plating solution. This is to prevent insufficient contact of the objects W to the cathode(s) of periphery of the container and to prevent overflow of the objects from the upper surface of the plating solution when the objects are powder such as very fine particles, because they do not accustom to the plating solution due to very light weight for each of them and these particles flow on the surface of the plating solution by centrifugal force.

In the plating operation S04 shown in FIG. 17, plating treatment is carried out by energizing through a rectifier (FIG. 16) under the condition of pushing the objects W toward the circular cathodes N0 by centrifugal force in accordance with operating condition parameters input by the operator.

In the defoaming operation S06 shown in FIG. 17, such operation is carried out under the condition of decreasing the rotation speed and floating foams on the surface in order to remove the foams. In practice, such operation is carried out on a mandatory basis by invalidating a level sensor (not shown) and outflowing the plating solution from the upper opening Z0 (FIG. 16). Here, the reason for occurring foams is one of that the plating solution becomes foamy as a result of air to be mixed into the plating solution by stirring the objects because surface acting agent is contained in the solution and that that the plating solution becomes foamy as a result of hydrogen gas generated during electroplating.

In the plate dewatering operation S08 shown in FIG. 17, supply of the plating solution is suspended under the rotation of the container and the solution is discharged. No reverse rotation is carried out in the plate dewatering operation S08 and the washing dewaterization operation S11 in order to avoid damages on the treatment objects W.

Even in the above-described operation, it is important to reach appropriate operating conditions in order to carry out desired plating on the treatment object because various parameters such as the number of constant rotation of the container during the plating treatment, acceleration period reaching to the constant rotation speed, the amount of energization and so forth vary depending on a variety of conditions such as shape of the object, position of plating, fluidity of the solution and so forth.

Patent Document 1: Patent laid-open publication No. 2006-037184

Patent Document 2: Patent laid-open publication No. Hei 08-239799

Patent Document 3: Patent laid-open publication No. Hei 07-118896

Patent Document 4: Patent laid-open publication No. Hei 09-137289

DISCLOSURE OF THE INVENTION

Problem to be Solved by the Invention

However, since the quality of plating formed by the plating operation is subjected to a variety of influences of complex factors such as shape of the object, position of plating, kind of the solution and so forth, the operation for reaching to the optimum operation parameters using a conventional method is cumbersome. The conventional method for reaching to the optimum operation in which the operator inputs parameters each time to the rotary surface treating apparatus and adjusts the parameters requires a series of repeat works such as input-operation-observation (adjustment for the requirements) many times. Such repeat works includes observation of the relationship between behavior of the treatment objects within the container and the rotation number of the container during the operations, observation of the aggregation state of the objects and of the plate thickness and so forth.

Also, the above described adjustment for the requirements need to be carried out whenever any of weight/particle diameter/shape of the objects vary even when similar objects are used thereby the adjustments become complicated.

Further, in the case of carrying out plating treatment to other treatment object(s) after performing plating treatment, the input/setting of operating conditions all over again form the beginning requires a lot of work.

Means for Solving the Problem (1) An operating condition determination method for determining an operating condition of a rotary surface treating apparatus according to the present invention comprises the steps of setting an appropriate energization parameter, after setting a liquid parameter, using the liquid parameter.

In other words, the present invention relates to an operating condition determination method for determining an operating condition of a rotary surface treating apparatus for carrying out a desired electroplating to a treatment object, the rotary surface treating apparatus comprising:

a surface treatment part for carrying out electroplating by energizing between an anode provided to a treatment container and a cathode arranged in a direction of periphery of the container under the condition of shifting the object in a direction of periphery of the container while outflowing surface treatment solution by rotating the container holding the surface treatment solution and a treatment object therein; and a control part having a storage part for storing a plurality of operating condition parameters, and for controlling the surface treatment part based on the operating condition parameters stored in the storage part;

wherein the operating condition parameters stored in the storage part include a liquid parameter and an energization parameter, wherein a first test operation is carried out by the control part through control of the plating treatment part under the condition that no energization is carried out utilizing the liquid parameters stored in the operating condition parameter storage part as a first operating condition, wherein the control part carries out a second test operation using a second operating condition under the condition that energization is carried out utilizing the energization parameter stored in the operating condition storage part as the second operating condition in consideration of the result of the first test operation, and wherein the operating condition that is selected as the optimum operating condition according to the result of the second test operation is registered to the storage part.

As a consequence, it is possible to limit the liquid parameter in some extent without performing energization (without replacing treatment object in the first test operation, so that the optimum operating condition parameters for carrying out plating treatment can be derived in a very efficient way. In this way, a cost-effective and environmental-friendly method can be provided because less disposal of the treatment object caused by poor plating is expected.

(2) An operating condition determination method for determining an operating condition of a rotary surface treating apparatus according to the present invention comprises the steps of carrying out a preliminary test operation for a series of surface treatment such as plating in advance and narrowing the operating conditions and then setting a liquid parameter and an energization parameter.

In other words, the present invention relates to an operating condition determination method for determining an operating condition of a rotary surface treating apparatus for carrying out a desired electroplating to a treatment object, the rotary surface treating apparatus comprising:

a surface treatment part for carrying out electroplating by energizing between an anode provided to a treatment container and a cathode arranged in a direction of periphery of the container under the condition of shifting the object in a direction of periphery of the container while outflowing surface treatment solution by rotating the container holding the surface treatment solution and a treatment object therein; and a control part having a storage part for storing a plurality of operating condition parameters, and for controlling the surface treatment part based on the operating condition parameters stored in the storage part;

wherein the operating condition parameters stored in the storage part include a liquid parameter and an energization parameter, wherein a preliminary test operation for plating treatment is carried out utilizing one of the operating condition to be input and the operating condition previously stored in the operating condition storage part, wherein a first test operation is carried out by the control part through control of the surface treatment part under the condition that no energization is carried out utilizing a first operating condition changing the liquid parameter during the first test operation according to a result of the preliminary test operation, wherein the control part carries out a second test operation using a second operating condition under the condition that energization is carried out utilizing the energization parameter stored in the operating condition storage part as the second operating condition in consideration of the result of the first test operation, and wherein the operating condition that is selected as the optimum operating condition according to the result of the second test operation is registered to the storage part.

As a consequence, it is possible to set the liquid parameter and the energization parameter under the condition that the result can previously be predictable even when plating treatment is carried out on treatment object that has never been treated before and the optimum operating condition parameters for carrying out plating treatment can efficiently derived within a relatively short period.

(3) An operating condition determination method for determining an operating condition of a rotary surface treating apparatus according to the present invention comprises the step of initially setting a liquid parameter out of operating parameters.

In other words, the present invention relates to an operating condition determination method for determining an operating condition of a rotary surface treating apparatus for carrying out a desired surface treatment to a treatment object, the rotary surface treating apparatus comprising:

a surface treatment part for carrying out electroplating by energizing between an anode provided to a treatment container and a cathode arranged in a direction of periphery of the container under the condition of shifting the object in a direction of periphery of the container while outflowing surface treatment solution by rotating the container holding the surface treatment solution and a treatment object therein; and a control part having a storage part for storing a plurality of operating condition parameters, and for controlling the surface treatment part based on the operating condition parameters stored in the storage part;

wherein the operating condition parameters stored in the storage part include a liquid parameter and an energization parameter, wherein a first test operation is carried out by the control part through control of the plating treatment part under the condition that no energization is carried out utilizing a first operating condition adjusting the liquid parameter and an appropriate operating condition of the liquid parameter is registered to the storage part.

As a consequence, it is possible to narrow for appropriate operating conditions by carrying out test operations under the condition that no energization is carried out (without replacing treatment object), and the exhaust of treatment object (less disposal of the treatment object caused by poor plating and so forth) can be minimized. In this way, a cost-effective and environmental-friendly method can be provided.

(4) In an operating condition determination method for determining an operating condition of a rotary surface treating apparatus according to the present invention, the operating condition parameters used for the preliminary test operation are previously stored in the storage part corresponding to a type of the treatment object.

As a consequence, the optimum operating condition parameters for carrying out plating treatment can efficiently be derived corresponding to the type of the treatment object.

(5) In an operating condition determination method for determining an operating condition of a rotary surface treating apparatus according to the present invention, the liquid parameter includes at least a rotation acceleration period, a rotation deceleration period, a constant rotation period and a constant rotation number.

As a consequence, the optimum operating condition parameters during plating treatment can efficiently be derived for that include at least acceleration period, deceleration period, rotation period and constant rotation speed.

(6) In an operating condition determination method for determining an operating condition of a rotary surface treating apparatus according to the present invention, the constant rotation number is set in plural phases.

As a consequence, the optimum operating condition parameters for carrying out plating treatment can efficiently be derived even when the constant rotation number has changed in various phases.

(7) In an operating condition determination method for determining an operating condition of a rotary surface treating apparatus according to the present invention, the energization parameter includes at least an electric current for plating and a plating period.

As a consequence, the optimum operating condition parameters for carrying out plating treatment can efficiently be derived for at least the electric current for plating and the plating period.

(8) In an operating condition determination method for determining an operating condition of a rotary surface treating apparatus according to the present invention, energization automatically stops when a cycle corresponding to a predetermined electric charge calculated by multiplication of the electric current for plating and the plating period is completed during the second test operation.

As a consequence, the optimum operating condition parameters, for carrying out plating treatment in which energization stops after reaching the electric charge to a predetermined amount, can efficiently be derived.

(9) In an operating condition determination method for determining an operating condition of a rotary surface treating apparatus according to the present invention, the rotary surface treating apparatus further comprises a parameter input part, and wherein a graph illustrating an operating pattern is displayed on a display screen of the operating condition parameter displayed on the parameter input part in response to input columns of various parameter values.

As a consequence, the optimum operating condition parameters for carrying out plating treatment can efficiently be derived because input of the operating condition parameters can be carried out while recognizing a graph illustrating an operating pattern.

(10) A rotary surface treating apparatus according to the present invention comprising:

a surface treatment part for carrying out electroplating by energizing between an anode provided to a central part of a treatment container and a cathode arranged in a direction of periphery of the container under the condition of shifting the object in a direction of periphery of the container while outflowing surface treatment solution by rotating the container holding the surface treatment solution and a treatment object therein; and a control part having a storage part for storing a plurality of operating condition parameters, and for controlling the surface treatment part based on the operating condition parameters stored in the storage part;

wherein the operating condition parameters stored in the storage part include a liquid parameter and an energization parameter;

wherein a first test operation is carried out by the control part through control of the plating treatment part under the condition that no energization is carried out utilizing the liquid parameters stored in the operating condition parameter storage part as a first operating condition, wherein the control part carries out a second test operation using a second operating condition under the condition that energization is carried out utilizing the energization parameter stored in the operating condition storage part as the second operating condition in consideration of the result of the first test operation, and wherein the operating condition that is selected as the optimum operating condition according to the result of the second test operation is registered to the storage part.

As a consequence, it is possible to make a trial and error period short by extracting and setting the operating conditions for surface treatment even the treatment object that has never been treated before is treated, thereby a cost-efficient and easy-to-use apparatus can be provided.

(11) An operating condition determination program according to the present invention comprising:

a surface treatment part for carrying out electroplating by energizing between an anode provided to a central part of a treatment container and a cathode arranged in a direction of periphery of the container under the condition of shifting the object in a direction of periphery of the container while outflowing surface treatment solution by rotating the container holding the surface treatment solution and a treatment object therein; and a control part having a storage part for storing a plurality of operating condition parameters, and controlling the surface treatment part based on the operating condition parameters stored in the storage part;

wherein the certain steps of the operating condition determination program comprises the steps of:

carrying out a first test operation by the control part through control of the plating treatment part under the condition that no energization is carried out utilizing a first operating condition adjusting a liquid parameter in the first test operation according to an operating condition to be input and an operating condition previously stored in the operating condition storage part;

performing a second test operation by the control part under the condition that energization is carried out utilizing a second operating condition adding an energization parameter in the second test operation according to the result of the preliminary test operation and the first test operation; and carrying out registration of the operating condition that is selected as the optimum operating condition according to the result of the second test operation is registered to the storage part.

As a consequence, it is possible to set the liquid parameter and the energization parameter through the use of the previously defined operating condition parameters even when treatment object that has been treated before, thereby the optimum operating condition parameters for carrying out plating treatment can efficiently derived within a relatively short period.

The features of the present invention may broadly be described as in the above, the details and the features of each configuration will further be apparent from the below disclosure taken in connection with the accompanying drawings.

BRIEF DESCRIPTION OF DRAWINGS

FIG. 6 is a diagram showing a setting screen of operating condition parameters during the preliminary test operation.

FIG. 7 is a graph showing a basic operating pattern during plating treatment.

FIG. 9 is a diagram showing a setting screen of operating condition parameters during the first test operation.

FIG. 18 is diagrams showing data examples of operating condition parameters stored in a storage part B6.

DESCRIPTION OF REFERENCE NUMERALS

100: Rotary surface treating apparatus
B2: Plating treatment part
B4: Control part
B6: Storage part
B8: Parameter input part
B10: Operation state selector switch

EMBODIMENTS FOR CARRYING OUT THE INVENTION

[Structure and Mechanism of Rotary Surface Treating Apparatus 100]

Figure 1:
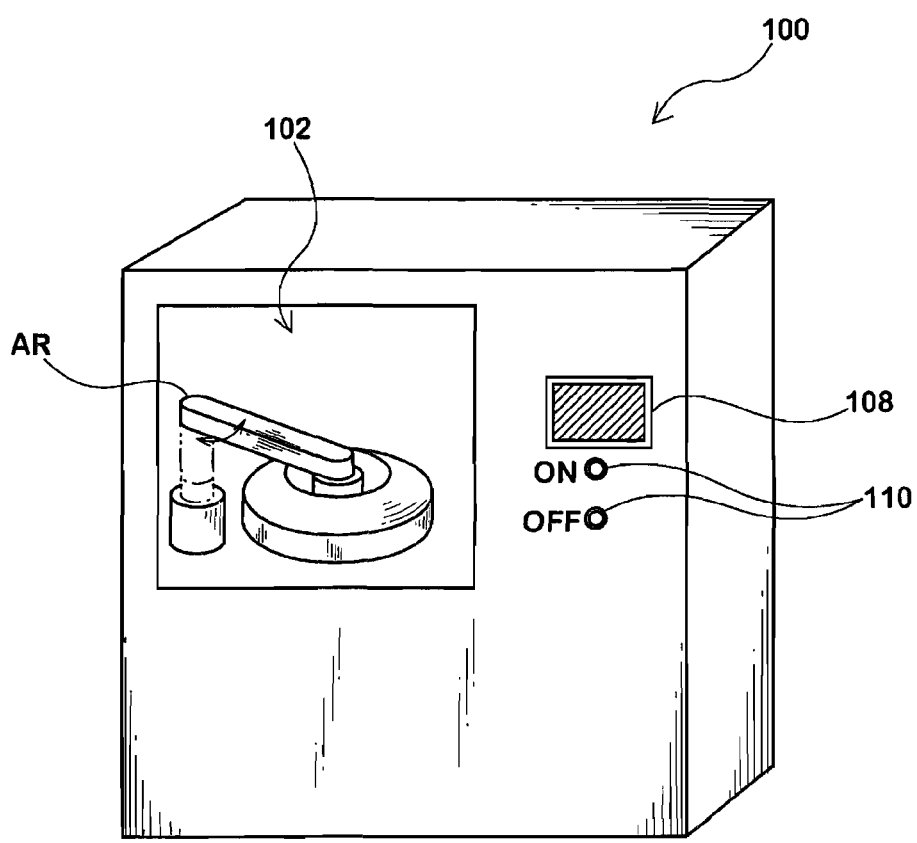
FIG. 1 is a diagram showing an external view of a rotary surface treating apparatus 100 according to the present invention.
Figure 15A:
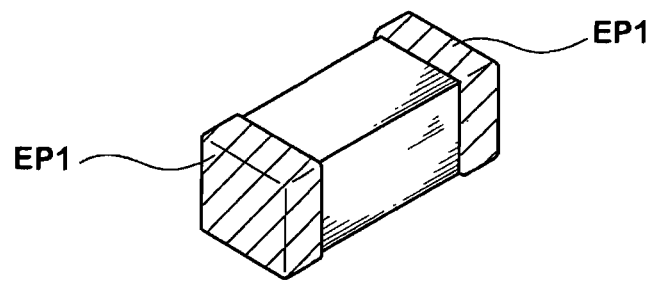
FIG. 15 are diagrams illustrating examples of small objects that become plating treatment object.
Figure 15B:
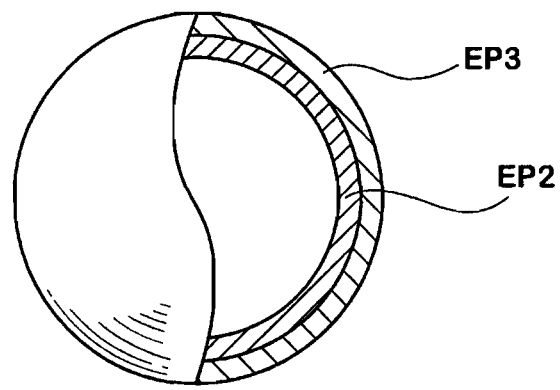

FIG. 1 is a diagram showing an external view of a rotary surface treating apparatus 100 according to the present invention. In this embodiment, an example of carrying out a predetermined thick of tin plating on both ends of rectangular solids shown in FIG. 15A by the rotary surface treating apparatus 100 will be described.

As shown in FIG. 1, the rotary surface treating apparatus 100 has a plating treatment part 102 for carrying out rotary plating treatment for an object to be processed (work), and arranged thereon a touch panel 108 and a selector switch 110 for switching on/off state of automatic operation on its front. The operation control of the plating treatment part 102 is performed by a built-in PLC (that will be described later) of the rotary surface treating apparatus 100.

Figure 2:
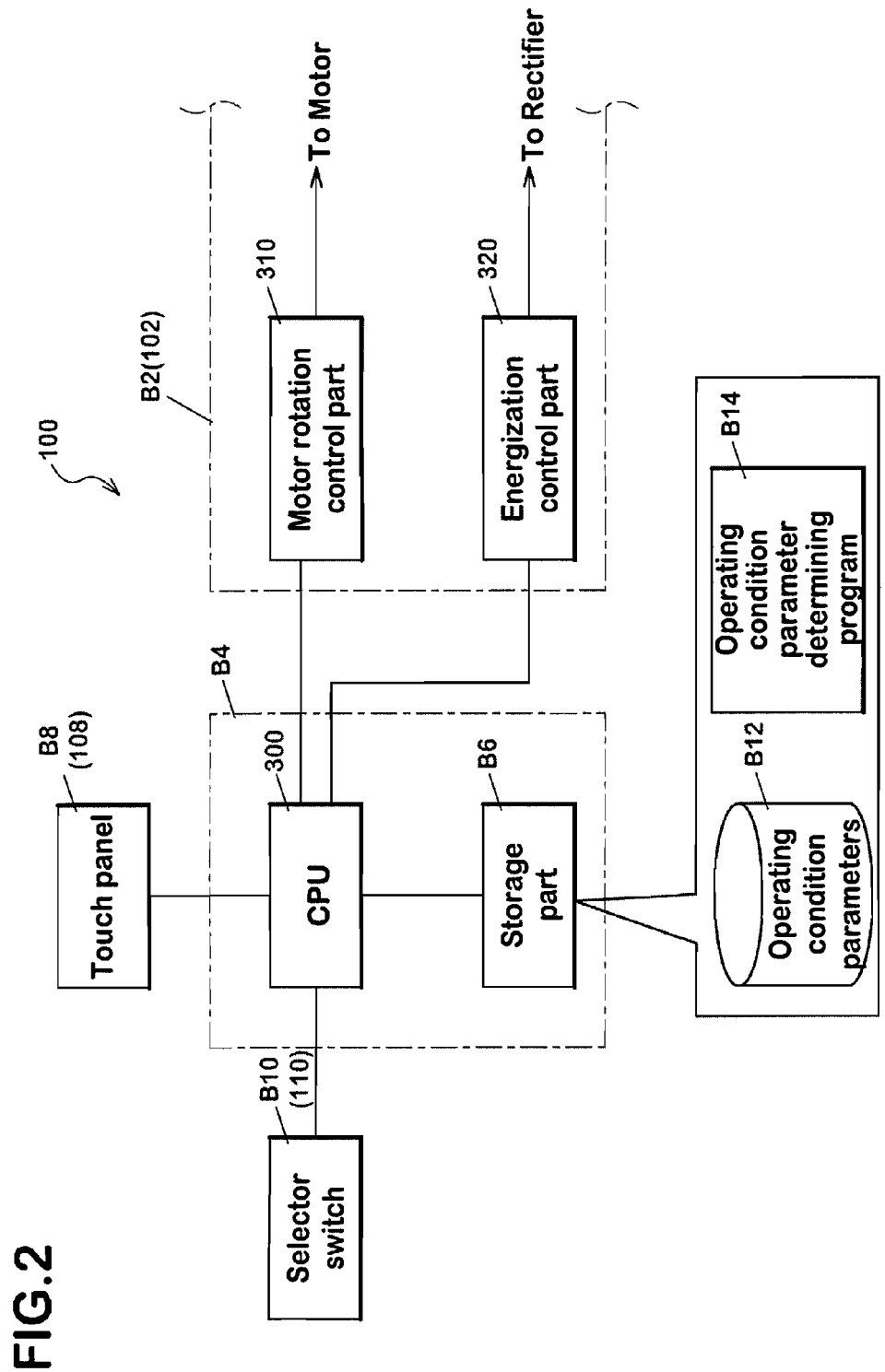
FIG. 2 is a block diagram of the rotary surface treating apparatus 100 according to the present invention.

FIG. 2 is a block diagram of the rotary surface treating apparatus 100 according to the present invention. As shown in FIG. 2, the rotary surface treating apparatus 100 of this invention comprises a plating treatment part B2 (corresponding to the plating treatment part 102 shown in FIG. 1), a control part B4 formed of a PLC, a touch panel B8 forming a parameter input part (corresponding to the touch panel 108 shown in FIG. 1) and an operation state selector switch B10 (corresponding to the selector switch 110 for switching on/off state of automatic operation shown in FIG. 1).

The plating treatment part B2 (102) includes a motor rotation control part 310 for controlling operation of an apparatus during plating treatment and an energization control part 320 controlling energization during the plating treatment, these parts convey the controls from the CPU 300 forming the control part B4 to a motor and a rectifier.

The control part B4 comprises a storage part B6 forming a storage element such as a flash memory and the CPU 300, and operating condition parameters B12 that become parameters for carrying out automatic operation in the Plating treatment part B2 and an operating condition parameter-determining program B14 are stored within the storage part B6.

Upon receipt of an input from the operation state selector switch B10, the CPU 300 of the control part B4 controls automatic operation in the plating treatment part according to the operating condition parameters B12 stored in the storage part B6 by input from the parameter input part B8 and so on.

Figure 3:
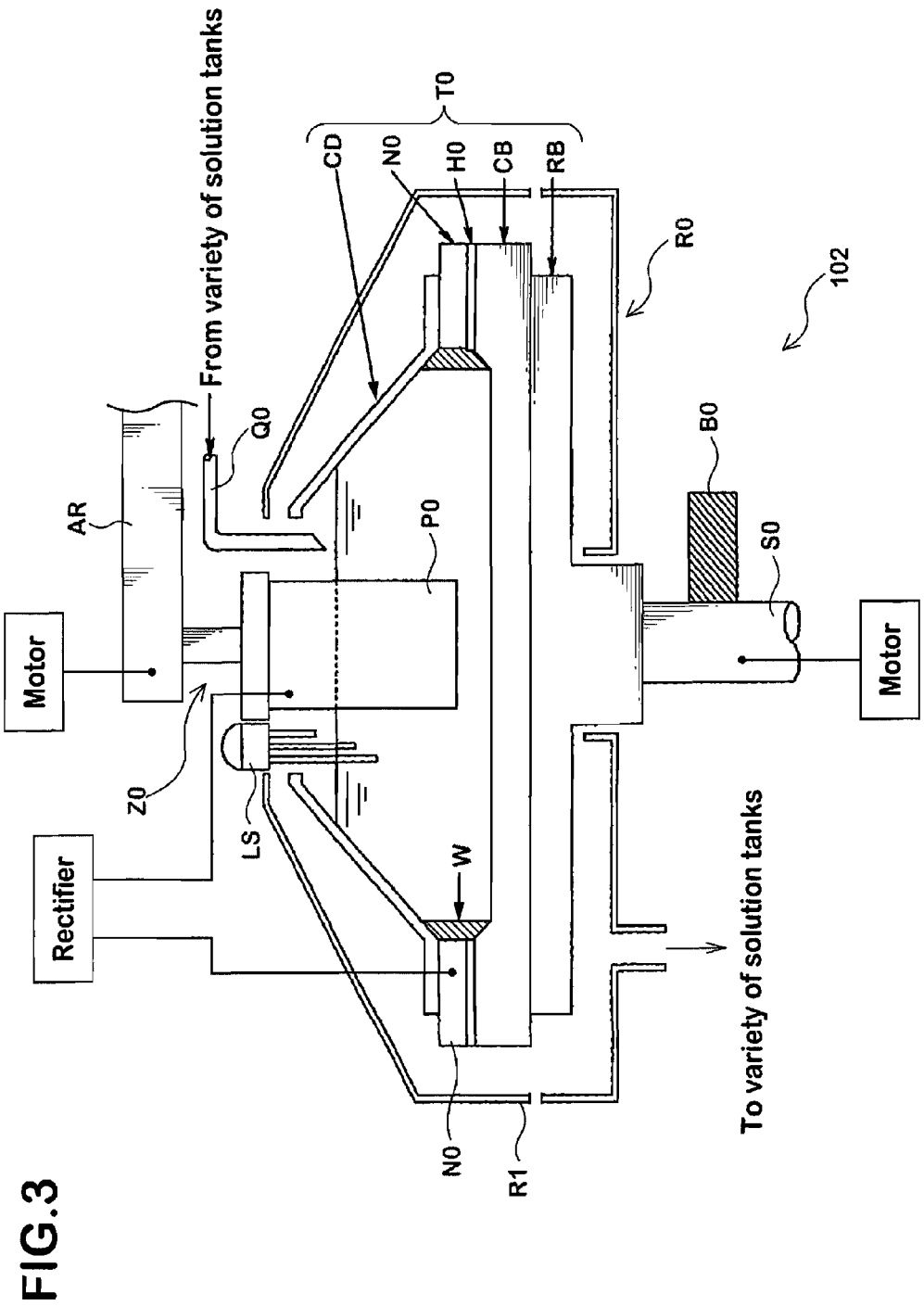
FIG. 3 is a diagram showing mechanism of a plating treatment part 102 of the rotary surface treating apparatus 100.
Figure 16:
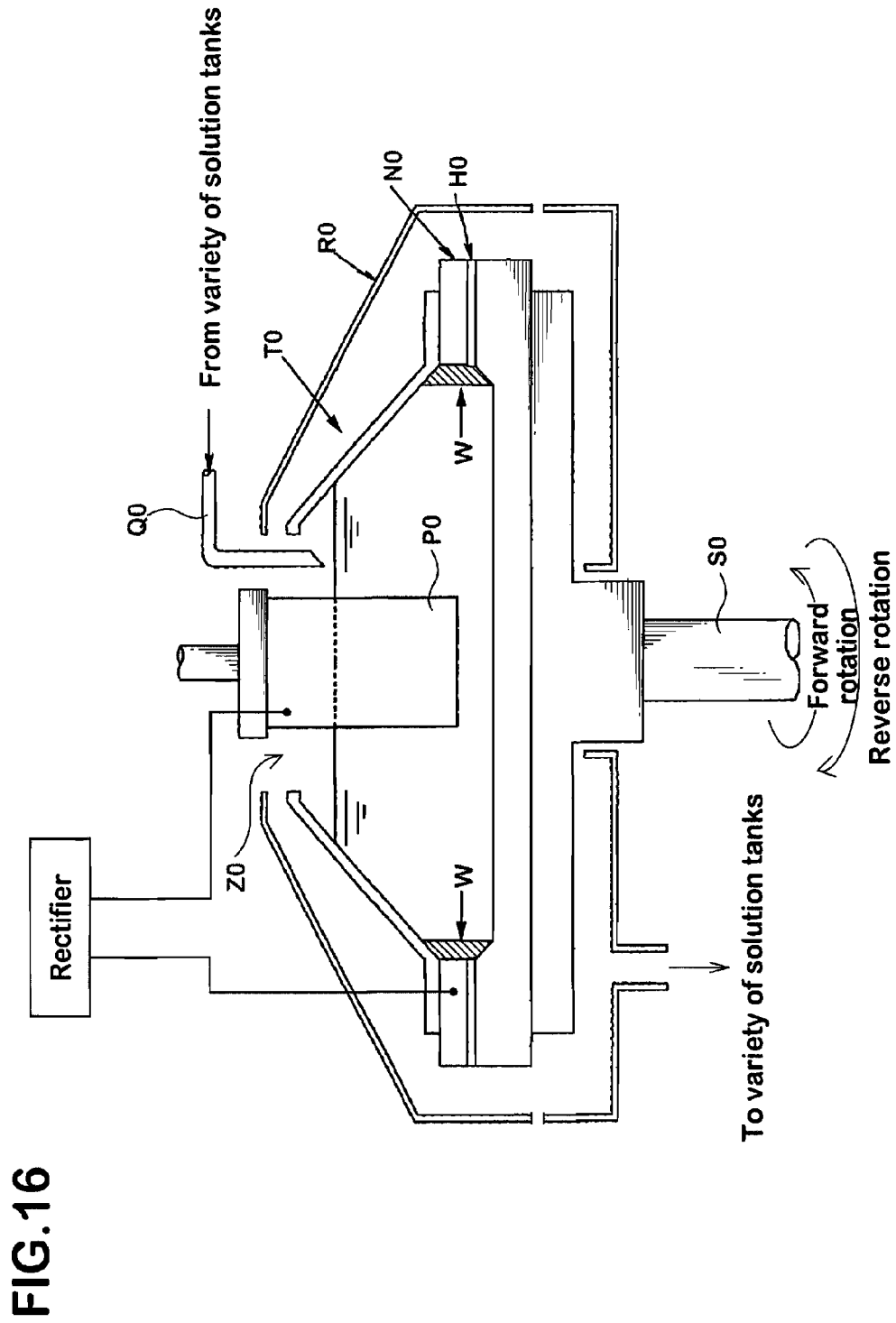
FIG. 16 is a diagram showing a general mechanism of rotation plating treatment.

FIG. 3 shows a diagram showing a mechanism of the plating treatment part 102 of the rotary surface treating apparatus 100. The structure of the plating treatment part 102 is similar to that shown in FIG. 16.

As shown in FIG. 3, the plating treatment part 102 includes a treatment container T0 having a circular cathode N0 mounted to a rotating drive shaft S0, an anode P0 provided to an arm AR movable to vertical and lateral directions and immersed in plating solution and a dome part R0 collecting plating solution splattered from a solution outflow part H0 of the treatment container T0.

In addition, as shown in FIG. 3, both the anode P0 and the cathode N0 are connected to the rectifier (via an inner wiring for the anode P0 and via a contact brush B0 for the cathode N0) and are energized by the rectifier receiving the control from the control part B4. Both the arm AR and the drive shaft S0 are connected to and are operated with the motor that is controlled by the control part B4.

As shown in FIG. 3, the anode P0 is arranged in a position such that it is immersed in plating solution at the center of the treatment container T0 that is formed of round shape. Plating treatment is carried out by energizing a treatment object W under the condition of covering the circular cathode N0 with the object as a result of moving it toward periphery of the treatment container T0 by centrifugal force thereof. Although plating solution always splatters from the circular shaped solution outflow part H0, such solution is collected by the dome part R0 and is refilled from a solution supply pipe Q0 through an upper opening Z0 to the treatment container T0. The fluid level of the treatment container T0 is measured by a level sensor LS.

As shown in FIG. 3, the treatment container T0 is formed by fixing a cell dome CD having the opening Z0 on the upper part thereof, a cathode ring N0 that is the circular cathode N0 and the solution outflow part H0 of a porous ring formed of a heat-treated plate for penetrating just plating solution to a cell base CB with a bolt and the like. A rotary base (flange) connecting the rotating drive shaft S0 is also fixed to the cell base CB.

Figure 4:
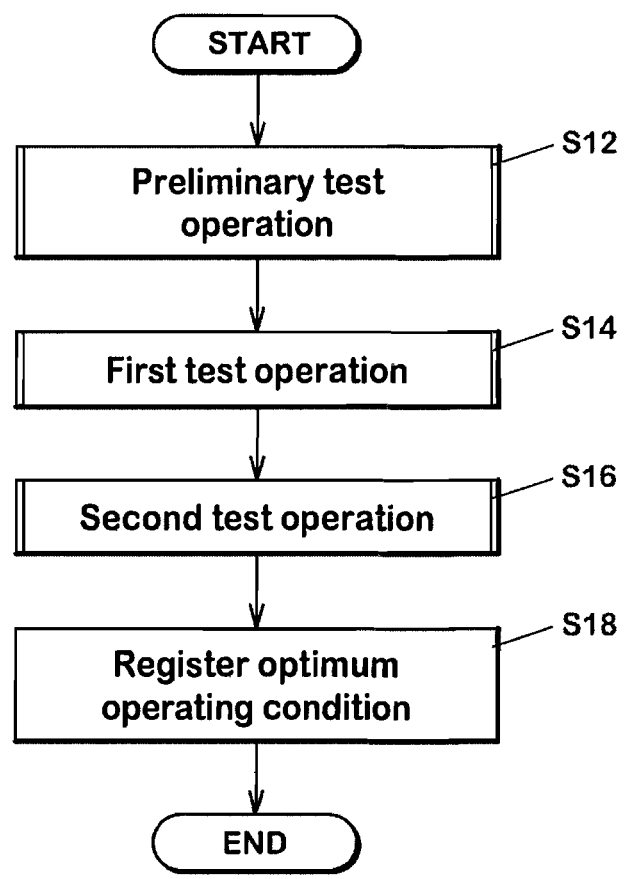
FIG. 4 is a flow chart showing overall process of operating condition parameter-determining process.

FIG. 4 is a flowchart showing an overall process of operating condition parameters determination process performed by the operating condition parameter-determining program B14 (FIG. 2) stored in the storage part B6. As shown in FIG. 4, in this embodiment, initially, preliminary test operation (step S12) is carried out under the energized condition, then in light of such result, a sequential operations such as a first test operation (step S14) under the non-energized condition and a second test operation (step S16) under the energized condition are carried out, and then the optimum operating conditions are registered (step S18).

[Treatment During the Preliminary Test Operation]

The operating condition parameter-determining process shown in FIG. 4 starts by activating the operating condition parameter-determining program B14 after putting an object to be processed into the treatment container. Initially, the CPU 300 carries out the preliminary test operation (step S12). Input of the treatment object into the container is carried out under the condition such that the arm AR is in a position shifted from the original position (illustrated in dashed line in FIG. 1) and that an openable cover R1 forming the dome part R0 shown in FIG. 3 is opened. When the treatment object is put into the container, the cover R1 of the dome part R0 closes and the arm AR is inserted into the opening Z0 as illustrated in solid line in FIG. 1 and plating solution is supplied from a variety of solution tanks, so that the apparatus is in an operation standby state.

Figure 5:
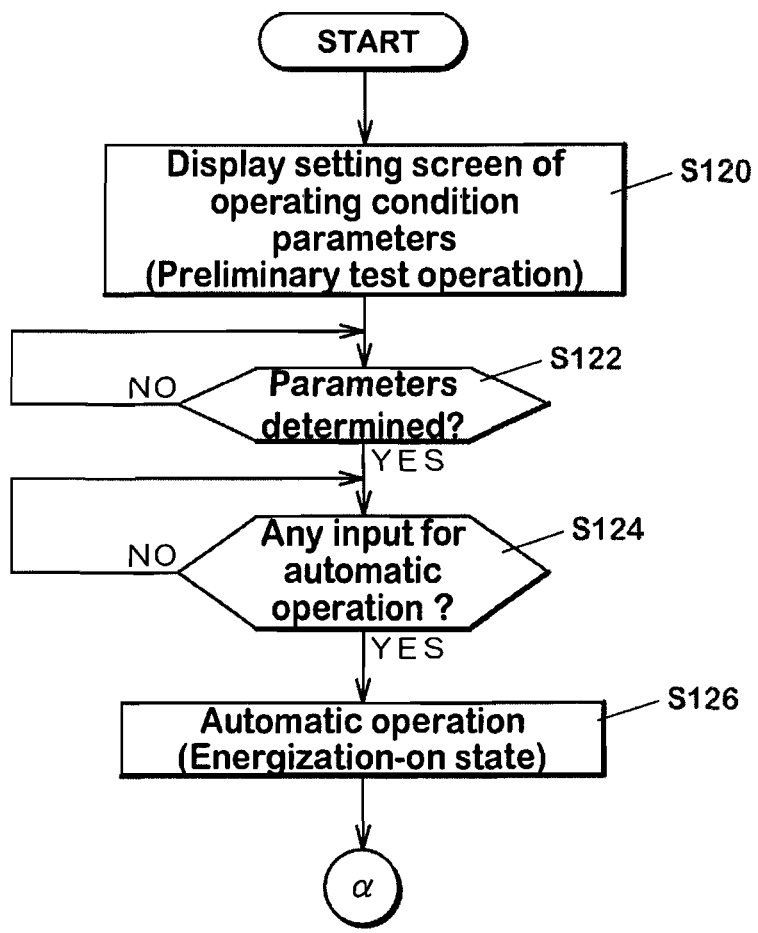
FIG. 5 is a flow chart showing detailed process during preliminary test operation (step S12).

FIG. 5 is a flow chart showing detailed process of the preliminary test operation. The CPU 300 reads out operating condition parameters previously stored in the storage part B6. FIG. 18 shows data examples of operating condition parameters stored in a storage part B6. The operating condition parameters are data representing the rotational direction, rotational speed and periods of rotation of the motor and so on as parameters in response to the types of treatment objects (left hand side of FIG. 18). In FIG. 18, a table (right hand side of FIG. 18) indicating actual values corresponding to acceleration period, deceleration period, number of rotations (speed) is also stored. For example, the acceleration period is "1" when the treatment object is "cubic component". By looking at the table shown on right hand side of FIG. 18, it is understood that the actual acceleration period is 1.0 sec (acceleration–1). Similarly, through the number of rotations (speed) is shown as "3", it is also understood that the actual value (speed) is 20.00 Hz (speed–3). Alternatively, the operating condition parameters can be identified as various types according to physical shape, dimension and material of the treatment object.

The CPU 300 reads out from the storage part B6 the operating condition parameters for preliminary test operation and displays on a touch screen 108 the parameters (step S120). FIG. 6 shows the operating condition parameters thus displayed. An operator selects operating condition parameters in response to the type of a treatment object(s) through the touch screen 108. For example,"cubic component" PN 1 (pattern No. 1) is selected as the type of the treatment object(s).

Alternatively, each of the parameters (periods, rotation speed and so forth) shown in FIG. 6 may be adjustably input through the touch screen 108, depending upon the operator's choice and the whole new parameters may be input. The rotation number is indicated indirectly with inverter frequency of the motor control part 310 in this embodiment, the rotation number may also be indicated directly with rotation number itself.

As shown in FIG. 6, a pattern graph illustrating an operating pattern is additionally displayed under entry fields such as an acceleration period d1, the number of rotation d6, a plating delay period d2, a plating period d3, a deceleration period d4, a quiescent period d5 and so on. This graph is easy to understand intuitively to the operator because physical relationship among the entry fields of the acceleration period d1, the number of rotation d6, the plating delay period d2, the plating period d3, the deceleration period d4, the quiescent period d5 and the graph properly correspond one another.

Parameters such as electric charge for plating d7, electric current for plating d8 and the number of cycle d10 are input through the touch screen 108 (for example, numeric keypad displayed on the display screen).

Upon completion of the input for setup, the operator pushes a setup button 200 (step S122). In response thereto, the CPU 300 stores the selected or inputted parameters into the storage part B6 as the parameters during preliminary test operation.

Subsequently, when the selector switch 110 for automatic operation is pushed by the operator, the CPU 300 carries out preliminary test operation according to the parameters (steps S124, S126).

The process of preliminary test operation according to the above-determined parameters will be described in below. Here, the case in which "cubic component" PN1 shown in FIG. 6 is determined as stated in step S122, will be described.

At first, the CPU 300 commands to the motor rotation control part 310 (FIG. 2) to activate the motor connected to the rotating drive shaft S0 in the positive rotation. At that time, the CPU 300 commands to the motor rotation control part 310 (FIG. 2) such that the number of rotation of the motor to be 20.00 Hz stored as "number of rotations", while the time period for reaching to a predetermined rotation number 20.00 Hz is controlled according to 1.0 sec. that is stored as "acceleration period".

The CPU 300 judges whether or not the rotation number of the motor reaches to the predetermined number. This judgment can be carried out by deriving the output frequency of an inverter from the motor rotation control part 310. Once the rotation number of the motor reaches to the predetermined number, the CPU 300 start a measurement using a timer and provides a command for energizing the anode P0 and the cathode N0 to the energization control part 320 when the count of the timer is equal to 2.0 sec. that is set as "plating delay period".

The reason why energization is not carried out immediately after reaching the predetermined rotation number is that energization should be carried out under the condition that the cathode to be covered sufficiently with treatment object. Further the CPU 300 commands to the energization control part 320 to energize with an electric current of 5A represented as "electric current for plating".

The CPU 300 suspends the energization by providing a command to the energization control part 320 when 4.0 sec. stored as "plating period" elapses while providing a command to the motor rotation control part 310 to conduct deceleration process. For the deceleration process, a command, by which the rotation suspends in 2.0 sec. that is stored as "quiescent period", is provided.

Upon suspending rotation of the motor, the CPU 300 stops for 1.0 sec. that is stored as "quiescent period".

Process for one-cycle (T illustrated in FIG. 6) is carried out as in the above description. FIG. 7 is a graph showing operating pattern for such one-cycle. The CPU 300 repeats this one-cycle process for 10 times that is stored as "number of cycles". The CPU 300 makes the motor to rotate in opposite direction to that of the previous cycle for each cycle, because "1" is stored as "Direction".

Details of the operating condition parameters shown in FIG. 6 will be described below using FIG. 7. FIG. 7 is a graph showing a basic operating pattern during plating treatment. The operating pattern shown in FIG. 7 is displayed below the operating condition parameters together with these parameters by selecting the type of the treatment object(s).

The acceleration period d1 shown in FIG. 6 is a time period requested for the rotation number of the treatment container to be a predetermined value (d6). The longer the acceleration period d1, much gentle the acceleration of the treatment container to reach to a constant rotation number.

The constant rotation number d6 shown in FIG. 6 is a rotation number of the treatment container at the constant rotation. As shown in FIG. 7, a constant rotation number is kept for a predetermined period (constant rotation period d9=the plating delay period d2+the plating period d3) at the constant rotation number d6. Although, the rotation number is represented by frequency in this embodiment, the rotation number varies depending on a type of the inverter and a diameter of the treatment container for the relationship with the circumferential speed.

The plating delay period d2 shown in FIG. 6 is a time period starting from after the lapse of the acceleration period d1 and ending at the start of energization to the treatment object (point x of FIGS. 6 and 7). In other words, energization is not performed intentionally even when the acceleration period d1 ends until the predetermined period elapses. This is because energization is carried out under the condition that the cathode to be covered sufficiently with the treatment object(s).

The plating period shown in FIG. 6 is a time period starting from the beginning of energization to the treatment object after the lapse of plating delay period d2 ending at the end of the energization. It is possible to energize at the time of reaching the predetermined value d6 without considering the plating delay period d2 if the quality of plating is high enough.

The deceleration period d4 shown in FIG. 6 is a time period starting from after the lapse of the plating period d3 ending at the time of making the rotation number zero, the longer the deceleration period d4, the much gentle the deceleration.

The quiescent period d5 shown in FIG. 6 is a time period starting from after the lapse of the deceleration period d4 ending at the acceleration period d1 of the subsequent cycle starts. In other words, the period is duration from completely stopping the rotation of the container until starting the subsequent rotation thereof.

The cycle period T1 shown in FIG. 7 is calculated by adding all the time periods (d1~d5) starting from the acceleration period ending at completion of the quiescent period. In this embodiment, since existence of forward and reverse is defined as d0=1 (direction) as shown in FIG. 6, plating treatment is carried out in the same cycle under its reverse mode when the forward cycle is completed. Forward and reverse cycles will continue until a desired plate thickness is obtained by energizing a predetermined electric charge for plating d7 described below.

The electric current for plating d8 shown in FIG. 6 is a value of an electric current energized to the treatment object and it is a fixed value in this embodiment. The electric charge for plating d7 shown in FIG. 6 is a value for determining the thickness of a plate membrane derived by multiplication of the total of plating periods d3 (for the number of cycles) and the electric current for plating d8. In other words, it is necessary to determine an appropriate electric charge for plating (an electric current for plating d8 and a plating period d3 for the number of cycles) in order to obtain a plate membrane having a desired thickness. Energization automatically stops and plating treatment ends when the predetermined electric charge for plating d7 is energized completely.

The operating condition parameters shown in FIG. 6 can be classified into liquid parameters related mainly to the movement of the treatment object during rotation thereof and energization parameters related mainly to energization of during the rotation.

The energization parameters comprises at least an electric current for plating d8 and a plating period d3 for calculating an electric charge for plating, the plating periods d3 is a time period starting from after the lapse of the plating delay period d2 post-acceleration period d1 and ending at the start of the deceleration period d4.

The liquid parameters comprises at least an acceleration period d1, a deceleration period d4, a fixed rotation period (d2+d3) and a rotation number d6. As for the treatment objects, it is desirable to push them all to the cathode after the rotation speed thereof reached to the rotation number d6. Since the plating delay period d2 is included into the constant rotation period, such plating delay period d2 maybe included into the liquid parameters.

[Treatment Performed in a First Test Operation]

Figure 8:
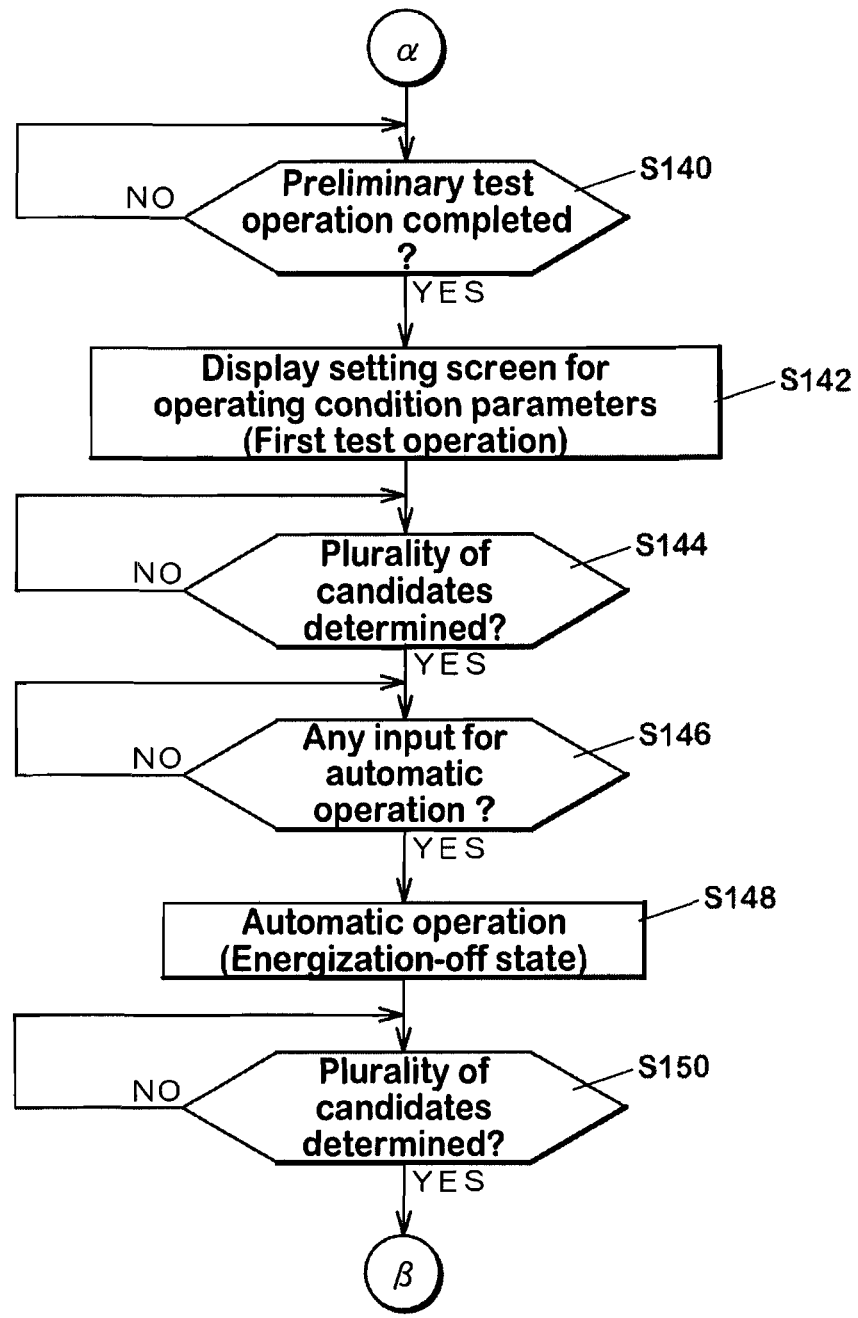
FIG. 8 is a flowchart showing detailed process during a first test operation.

As shown in FIG. 4, after carrying out a preliminary test operation (step S12), a first test operation (step S14) is carried out. FIG. 8 is a flowchart showing detailed process during the first test operation (step S14) shown in FIG. 4.

As shown in FIG. 8, when it is judged that the preliminary test operation is completed (step S140), the CPU 300 displays a setting screen for operating condition parameters (FIG. 9) for the first test operation (step S14) on a touch screen 108 (step S142). The operator setups a plurality of operating condition parameters (operating pattern candidates) by varying the liquid parameters in light of the result of the preliminary test operation through the touch screen 108.

Specifically, a plurality of operating condition parameters in light of the result of the preliminary test operation shown in FIG. 9 are setup by inspecting the operator for the movement of a treatment object(s) within plating solution, and the quality the treatment object(s) (plating thickness, existence of compact clusters, glaze and the like) to which plating treatment is carried out. When a visual observation in the rotary state is not easy, these parameters may automatically be setup by observing the movement of the treatment object(s) with a small camera and through the use of computer image processing.

Figure 10A:
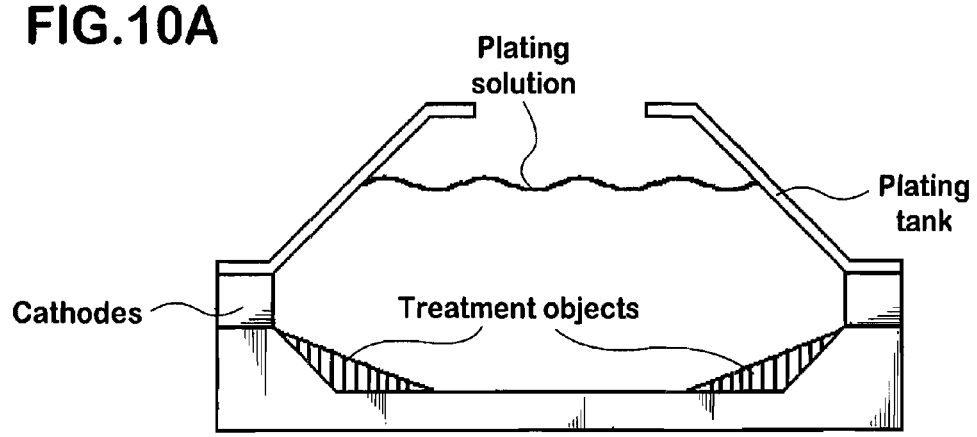
FIG. 10 are diagrams illustrating the conditions of insufficient coverage of the cathode with treatment objects during the rotation of plating treatment.
Figure 10B:
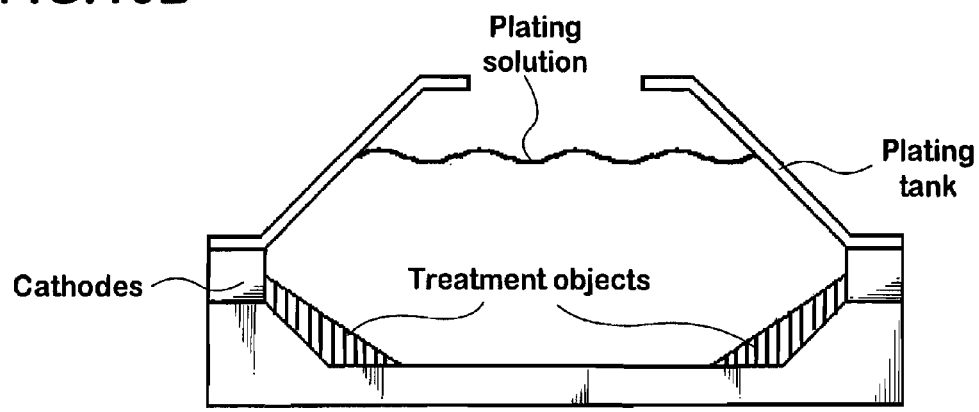

For setting up the liquid parameters, the following cases are considered and examined. For example, such cases includes a case that the treatment object(s) does not rise to the upper part of the cathode the treatment object (s)during the rotation as shown in FIG. 10. FIGS. 10A and 10B are diagrams illustrating the conditions of insufficient coverage of the cathode with treatment object(s) during rotation plating treatment.

The constant rotation number d6 is increased when it is judged that centrifugal force lacks such as the cases of the treatment object(s) does not rise to the upper part of the cathode and/or more time is required for such rise. The constant rotation number d6 is decreased when it is judged that too much centrifugal force is generated such as the cases of the treatment object rises sufficiently but the treatment object(s) hurts thereby and plating solution is splattered from an opening of the treatment container.

The time period required for stopping the rise is defined as a plating delay period d2 and such period is adjusted either shorter or longer when the rise of the treatment object does not completely stop even when the treatment container shifts its phase from the acceleration to the constant rotation. Consequently, the plating delay period d2 is unnecessary when the treatment object(s) rises sufficiently and stabilizes its rotation during the shift from the phase of the acceleration rotation to the constant rotation.

The following parameters are set when additional adjustment is needed after setting the constant rotation number d6 and the plating delay period d2 in this way.

Further, at the time of starting rotation of the treatment object(s) and that of starting deceleration in rotation, the treatment object(s) within the plating solution moves vicinity of the inner peripheral wall of the treatment container at a slower speed than the rotation speed of the treatment container, if the treatment object(s) is damaged by the friction with the inner peripheral wall during the movement as a result of making disagreement of the rotation speed between the container and the treatment object(s), the acceleration period d1 and the deceleration period d4, i.e. the acceleration period d1 and/or the deceleration period d4, are adjusted to either a shorter or a longer period in order to avoid damage of the treatment object.

In addition, since the plating solution within the container still rotates even after the rotation of the container stops, there might be a probability that the plating solution is splattered from the opening when immediate reverse rotation of the container is carried out, so that the quiescent period d5 may be adjusted to either a shorter or a longer period in light of such problem.

In these adjustments, a variety of treatment periods can be adjusted either shorter or longer in light of the total treatment period of the treatment steps.

By setting these liquid parameters, the treatment object(s) may rise so as to cover the cathode without damaging the treatment object(s) within the container while avoiding accidental application of plating to a part of the cathode on which the treatment object(s) is not contacted and undesired incorporation of exfoliated plate into the container as impurities.

Upon providing the treatment object(s) into the container, the operator inputs through the touch screen 108 a plurality of operating condition parameters (operating pattern candidates No. 1 to 5) that are varied according to the above-described criteria as shown in FIG. 9, for example. Although, no operating parameters for the preliminary test operation shown in FIG. 6 are shown in FIG. 9, it is possible to display such parameters together with the setting screen of the operating parameters shown in FIG. 9 (the first test operation) and to vary a plurality of operating condition parameters while looking at the display on the touch screen 108 by the operator.

When a plurality of operating condition parameters are input and then a setup button 202 is pushed (Yes in step S144), the control part B4 (FIG. 2) carries out a process for controlling automatic operation (energization-OFF state) performed by the plating treatment part 102 for each of the plurality of operating pattern candidates (step S148) as a result of receiving an input of turning-ON for automatic operation (Yes in step S146) through the touch screen 108. A practical control method for the plating treatment part 102 during automatic operation is similar to that of the preliminary test operation S12 (FIG. 4) except for no energization. Since no energization is carried out in the first test operation, automatic operation can be carried out for a plurality of operating patterns (patterns No. 3 to 5 shown in FIG. 9) without replacing the treatment object(s) within the container.

The operator further selects a plurality of operating condition parameters that are judged as good enough as a result of the above-described automatic operation (energization-OFF state) and presses the setup button 202 (step S150). For example, in a setting screen for operating condition parameters (the first test operation) shown in FIG. 9, the operating pattern candidates No. 3 to 5 (illustrated in shaded portions) that are judged as good enough are selected. The reason for setting a plurality of operating pattern candidates is that it is very difficult to predict the final quality of plating from the movement of the treatment object(s).

[Treatment Performed in a Second Test Operation]

Figure 11:
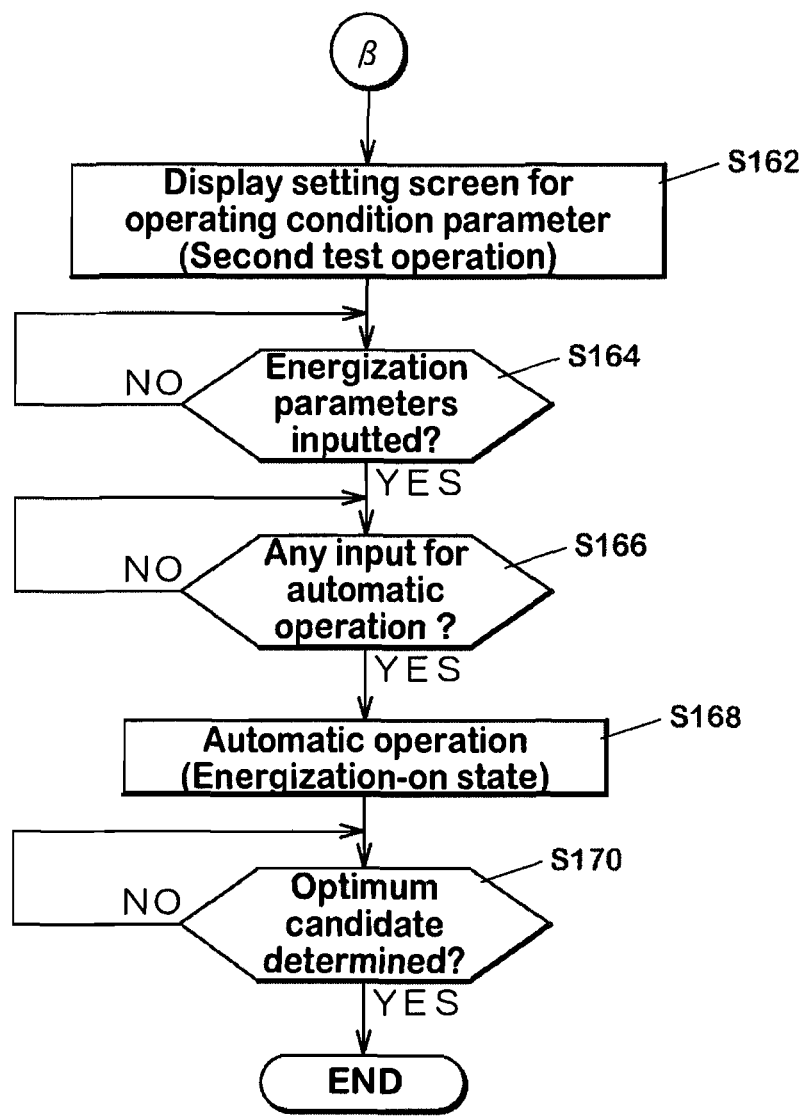
FIG. 11 is a flow chart showing detailed process during a second test operation.

Subsequent to carrying out the first test operation (step S14) shown in FIG. 4, the second test operation (step S16) is carried out. FIG. 11 is a flowchart showing detailed process during the second test operation (step S16) shown in FIG. 4.

Figure 12:
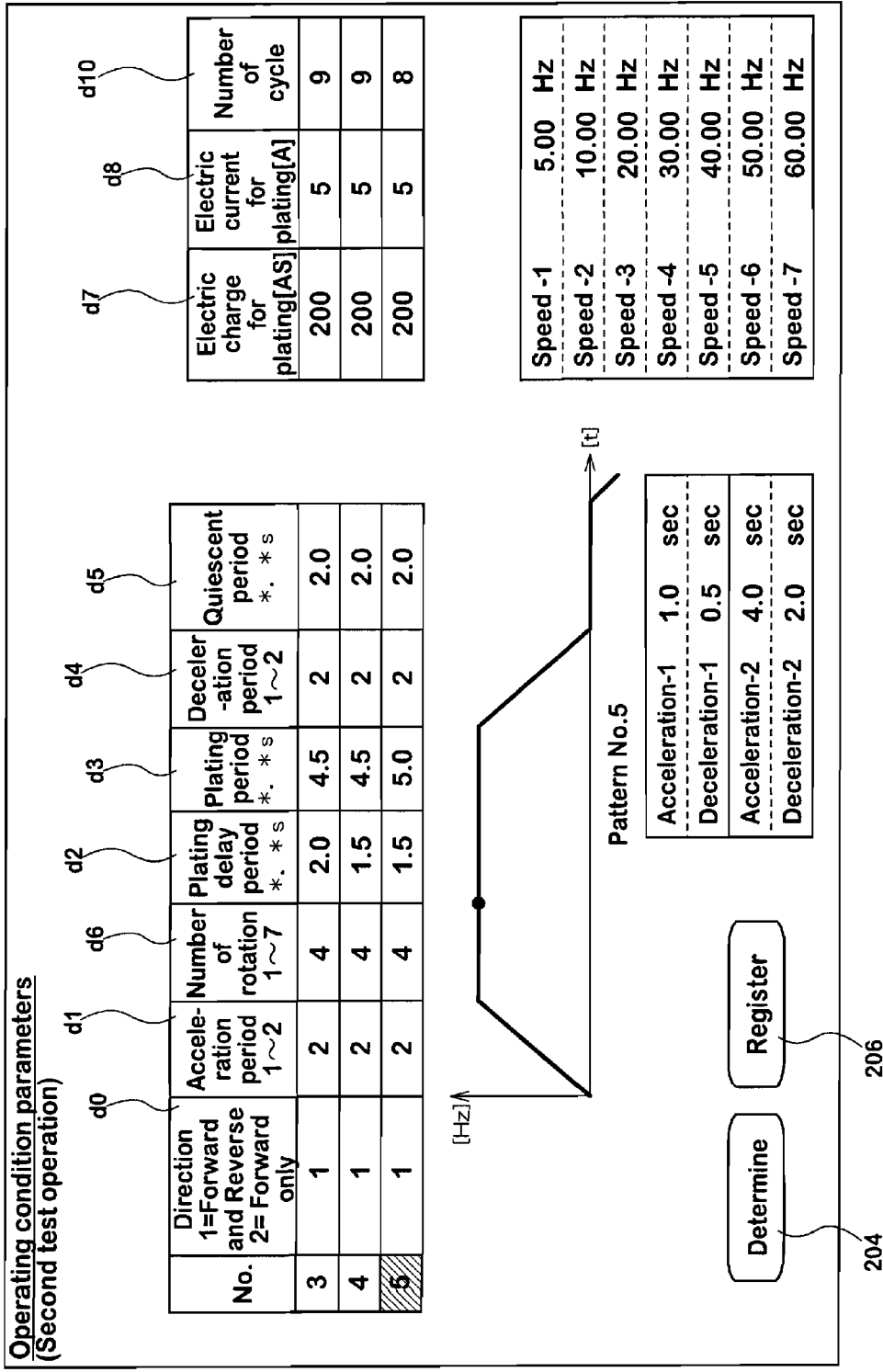
FIG. 12 is a diagram showing a setting screen of operating condition parameters during the second test operation.

When it is judged in step S150 of FIG. 8 by the operating condition parameter-determining program B14 (FIG. 2) that a plurality of operating condition parameters are selected and are determined (Yes in step S150), as shown in FIG. 11, a setting screen for operating condition parameters for the second test operation (step S16) is displayed on the touch screen 108 (step S162). Here, as shown in FIG. 12, only the operating pattern candidates (No. 3 to 5) selected at step S150 of FIG. 8 are extracted and displayed.

The operator further adds and sets energization parameters regarding to a plurality of operating condition parameters in light of the preliminary test operation and the first test operation through the touch screen 108.

The operator, for example, inputs energization parameters through the touch panel according to the below criteria (step S164). FIG. 12 is a diagram showing a setting screen of operating condition parameters during the second test operation.

In the case of accidental application of plating among a plurality of treatment objects during the preliminary test operation (step S12) shown in FIG. 4, the change of following three parameters is examined. In the case of longer energization period, the plating period d3 may be made shorter, and the plating current d8 may make lower in the case of too high current density. Further, in the case of occurrence a problem from a lower liquidity through congestion of treatment objects as a result of too strong centrifugal force, the rotation number d6 may be decreased. In this way, it is possible to prevent products failure caused by the congestion of the treatment objects.

In the case of consuming too much time for plating treatment, the number of seconds for the operating parameters d1 to d5 may be made shorter. Further, the value of the plating current d8 may be increased in the case of too slow plating because of too low current density. In this way, it is possible to increase productivity by shortening the time required for plating treatment while maintaining the quality of plating.

When the thickness of plating is either too thick or too thin, the electric charge for plating d7 is decreased or increased. In this way, it is possible to derive plating having a desired thickness while suppressing the occurrence of product failure.

Figure 17:
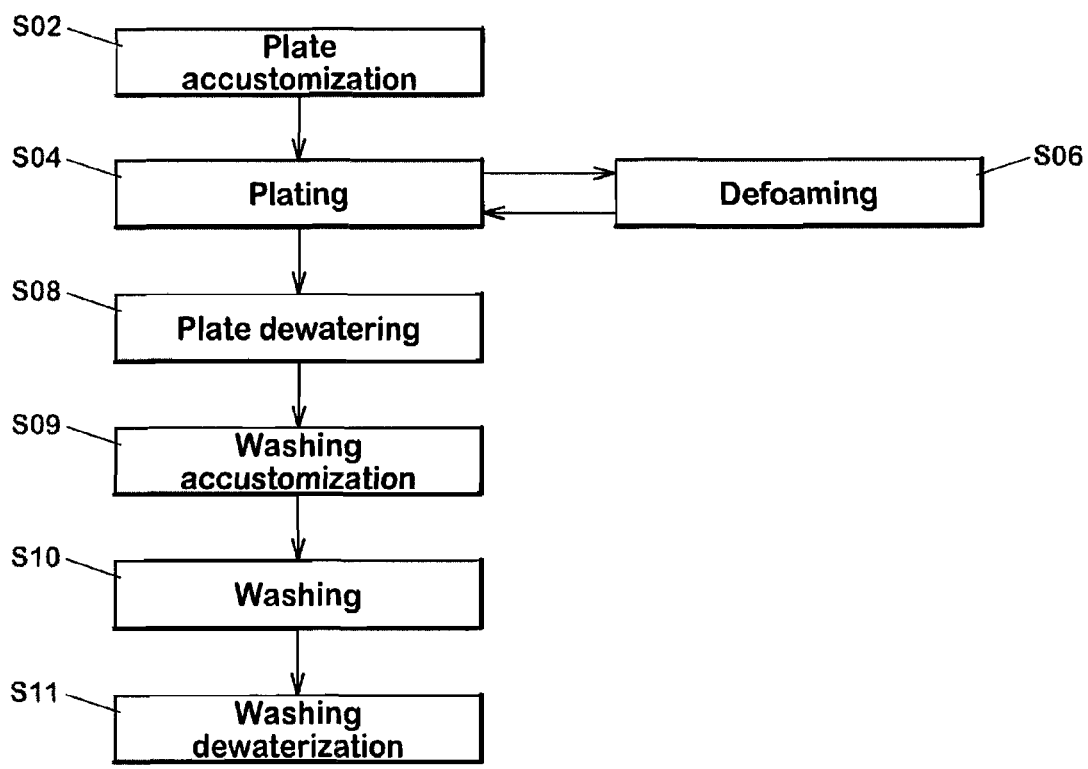
FIG. 17 is a flow diagram showing a series of operation in the plating treatment.

Defoaming operation S06 may be carried out during the plating operation S04 when plating is not done well because of bubbles generated in plating solution during the preliminary test operation (step S12). Specifically, a defoaming cycle parameter, which defines the defoaming operation S06 is carried out after performing a certain number of the plating operation S04 shown in FIG. 17, may be created. For example, when the defoaming cycle parameter is set as "4", the following process is carried out such that one (1) time of the defoaming operation S06 is carried out after performing four (4) cycles of the plating operation S04 and another one (1) time of defoaming operation S06 is carried out after performing another four (4) cycles of the plating operation S04 and then another two (2) cycles of the plating operation S04 is carried out for completion of this process because the number of cycles for the plating operation S04 in this embodiment is ten (10). The acceleration period, the constant rotation period, the constant rotation number, the deceleration period and the quiescent period during the defoaming operation S06 are preset.

When energization parameters are added for each of the operating pattern candidates and then a setup button 204 is depressed (Yes in step S164), automatic operation (energization-ON state) is carried out for each of the operating pattern candidates until a predetermined energization amount is supplied (step S168) in response to the depress of the automatic operation button (Yes in step S166). A tangible method for the plating treatment part 102 during the automatic operation is similar to that of the case in the preliminary test operation S12 described in the above.

Further, the operating condition parameters that are judged as the best parameters as a result of carrying out the above-described automatic operation (energization-ON state) are selected and determined (step S170). Upon completion of the second test operation, the operator selects parameters that are considered as the optimum operation conditions in accordance with the result of the second test operation, such operation condition parameters are registered as the optimum operation condition parameters in the storage part B6 (step S18 in FIG. 4) when a registration button 206 shown in FIG. 12 is depressed (Yes in step S170) and the operating condition parameter-determining program B14 completes its behavior.

After completion of the operating condition parameter-determining program B14, it turns out an normal operating mode in which plating treatment according to the optimum operating condition parameters with the registered parameters is carried out.

Other Embodiments

Figure 13:
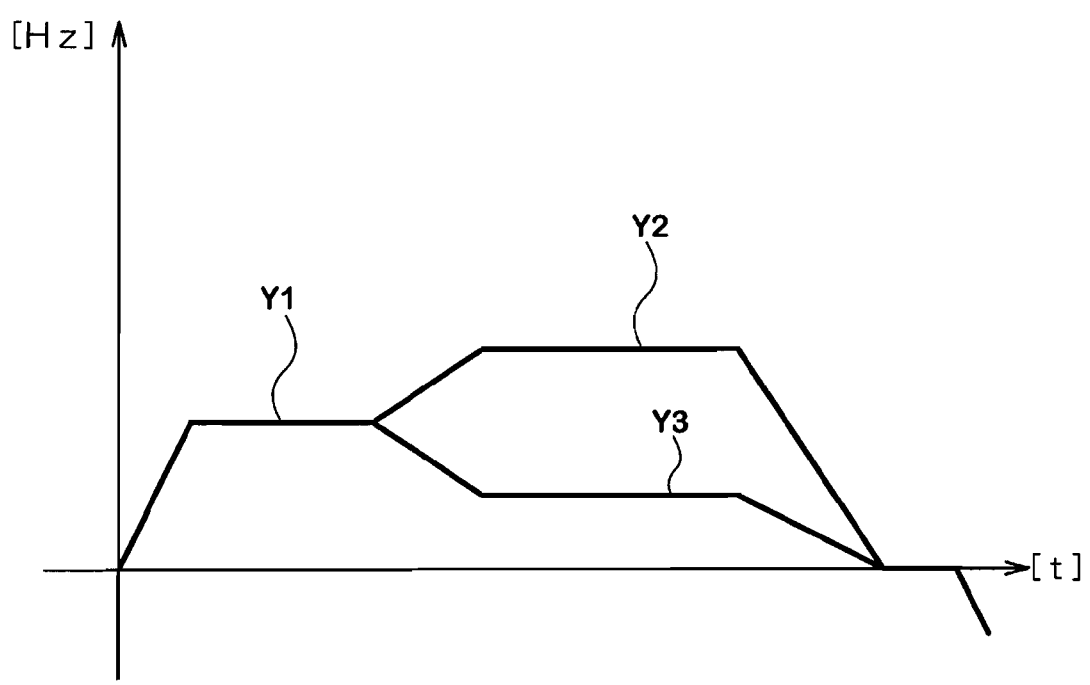
FIG. 13 is a diagram showing operating patterns when the number of rotation during the plating operation is set in two phases.

Although, just one constant rotation number is set during the plating operation in the above embodiments, it is possible to set the rotation number in plural phases such that the rotation number during the plating operation is in two phases such as the operating pattern shown in FIG. 13.

For example, in the case of setting the constant rotation number to increase from Y1 to Y2 in the graph shown in FIG. 13, it is advantageous for the treatment object(s) having a heavier weight on its own and/or one (s) that is breakable. In other words, it is possible to prevent damages on the treatment object(s) by reducing the impact thereon as a result of pulling the treatment object(s) to the circular cathode in a low speed, while preventing exposure of the cathode to the solution due to lack of speed and decrease of liquid circulation of the solution due to lack of centrifugal force. On the other hand, when the constant rotation number is set to decrease from Y1 to Y3, it is advantageous for the treatment object(s) having a lighter weight on its own, damages on the treatment object caused by centrifugal force and outflow of solution from the opening can be prevented by increasing centrifugal force through a high speed rotation to the cathode and then decreasing the rotational speed at the time of approaching the object(s) to the cathode in a certain extent.

Figure 14:
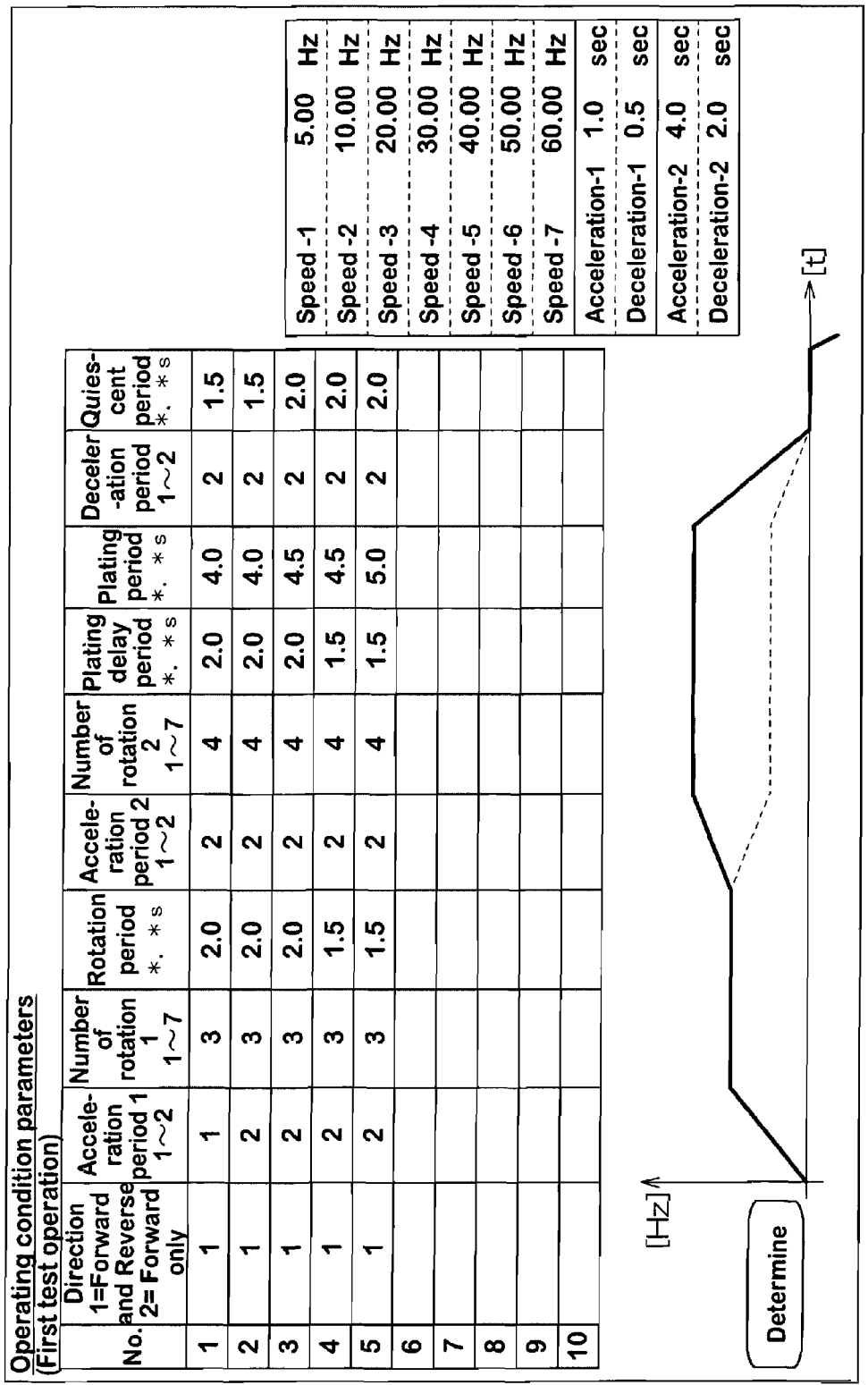
FIG. 14 is a diagram showing a setting screen of operating condition parameters when constant rotation speed is set in two phases.

FIG. 14 is a diagram showing a setting screen of operating condition parameters when the constant rotation speed is set in two phases. FIG. 14 corresponds to the operating condition parameter-setting screen in the first operation test operation shown in FIG. 9.

Although, a preliminary test operation (step S12 in FIG. 4) is carried out prior to the first test operation (step S14 in FIG. 4) in the above-described embodiment, the setup of operating condition parameters (adjustment for the requirements) may be performed only through the first and the second test operations without carrying out preliminary test operation.

Although, the second test operation (step S16 in FIG. 4) is performed after the first test operation (step S14 in FIG. 4) in the above-described embodiment, it is possible not to perform the second test operation. For example, the set of operating condition parameters (adjustment for the requirements) may also be performed through the first test operation in which no energization is carried out and utilizing only the liquid parameters.

Alternatively, the operating pattern corresponding to the treatment object is preset during the preliminary test operation in the above-described embodiment, the operator may input the operating pattern without presetting the pattern.

The preliminary test operation (step S12 in FIG. 4) is carried out under energization-state in the above-described embodiment, it is possible to carry out that operation under non energization-state (that is, utilizing just liquid parameters).

The case of carrying out nickel plating on the treatment object(s) has been described in the above-described embodiment, plating with other metals such as tin plating may be carried out. Just one certain kind of plating is carried out in the above-described embodiment, plural kinds of plating may also be carried out.

The case of presetting the operating condition for the defoaming operation has been described in the above-described embodiment, liquid parameters (the acceleration period d1, the deceleration period d4, the quiescent period d5, the rotation number d6, the number of cycle d10) may be appropriately set by carrying out rotation control of the treatment container during the defoaming operation S06 similar to that performed in the first test operation. Additionally, another parameter (defoaming cycle number) for setting the number of cycle in the defoaming operation S06 may also be set. As a consequence, it is possible to efficiently prevent plating failure caused by foams because the operating condition and the number of cycle in the defoaming operation S06 can freely be set in response to degree of the formation of foams and can efficiently carry out the defoaming operation S06.

The case of carrying out electroplating has been described in the above-described embodiment, electrolytic stripping may be carried out using solution for electrolytic stripping as solution for surface treatment instead of plating solution. The examples of carrying out electroplating have been described in the above-described embodiments, variety of surface treatments such as washing, stripping, activating and so forth may be carried out.

What is claimed is:

1. An operating condition determination method for determining an operating condition of a rotary surface treating apparatus for carrying out a desired electroplating to a treatment object, the rotary surface treating apparatus includes a surface treatment part for carrying out electroplating by energizing between an anode provided to a treatment container and a cathode arranged in a direction of the periphery of the container under the condition of shifting the object in a direction of the periphery of the container while outflowing surface treatment solution by rotating the container holding the surface treatment solution and the treatment object therein, and a control part having a storage part for storing a plurality of operating condition parameters, and for controlling the surface treatment part based on the operating condition parameters stored in the storage part, wherein the operating condition parameters stored in the storage part include a plurality of liquid parameters and an energization parameter, the method comprising:

carrying out a preliminary test operation for plating treatment by utilizing inputted operating condition parameters which had been previously stored in the storage part;

setting the plurality of liquid parameters as a first operating condition according to a result of the preliminary test operation, wherein one of the liquid parameters includes a constant rotation period, wherein the constant rotation period includes a plating delay period and a plating period;

carrying out a first test operation by the control part through control of the surface treatment part under the plurality of liquid parameters set as the first operating condition with no energization being carried out;

setting the plurality of liquid parameters and the energization parameter as a second operating condition determined based upon the result of the preliminary test operation and the first test operation, so that no energization is to be carried out during the plating delay period, and energization is to be carried out during the plating period;

carrying out by the control part a second test operation using the second operating condition under the condition that energization is carried out as set according to the second operating condition;

selecting as an optimum operating condition according to the result of the second test operation; and registering the optimum operating condition to the storage part.

2. The operating condition determination method for the rotary surface treating apparatus according to claim 1, wherein the operating condition parameters used for the preliminary test operation are previously stored in the storage part corresponding to a type of the treatment object.

3. The operating condition determination method for the rotary surface treating apparatus according to claim 1, wherein the plurality of liquid parameters include at least a rotation acceleration period, a rotation deceleration period, and a constant rotation number.

4. The operating condition determination method for the rotary surface treating apparatus according to claim 3, wherein the constant rotation number is set in plural phases.

5. The operating condition determination method for the rotary surface treating apparatus according to claim 1, wherein the energization parameter includes at least an electric current for plating and a plating period.

6. The operating condition determination method for the rotary surface treating apparatus according claim 1, further comprising automatically stopping the energization when a cycle corresponding to a predetermined electric charge calculated by multiplication of the electric current for plating and the plating period is completed during the second test operation.

7. The operating condition determination method for the rotary surface treating apparatus according to claim 1, wherein the rotary surface treating apparatus further comprises a parameter input part, the method further comprises displaying on a display screen a graph illustrating an operating pattern of the operating condition parameter displayed on the parameter input part in response to entry fields of various parameter values.

8. An operating condition determination method for determining an operating condition of a rotary surface treating apparatus for carrying out a desired electroplating to a treatment object, the rotary surface treating apparatus includes a surface treatment part for carrying out electroplating by energizing between an anode provided to a treatment container and a cathode arranged in a direction of the periphery of the container under the condition of shifting the object in a direction of the periphery of the container while outflowing surface treatment solution by rotating the container holding the surface treatment solution and the treatment object therein, and a control part having a storage part for storing a plurality of operating condition parameters, and for controlling the surface treatment part based on the operating condition parameters stored in the storage part, wherein the operating condition parameters stored in the storage part include a plurality of liquid parameters and an energization parameter, the method comprising:

setting the plurality of liquid parameters as a first operating condition, wherein one of the liquid parameters includes a constant rotation period, wherein the constant rotation period includes a plating delay period and a plating period;

carrying out a first test operation by the control part through control of the surface treatment part under the plurality of liquid parameters set as the first operating condition with no energization being carried out;

setting the plurality of liquid parameters and the energization parameter as a second operating condition determined based upon the result of the first test operation, so that no energization is to be carried out during the plating delay period, and energization is to be carried out during the plating period;

carrying out the second test operation by the control part using the second operating condition with energization being carried out as set according to the second operating condition;

selecting an optimum operating condition according to the result of the second test operation; and registering the optimum operating condition to the storage part.

9. A rotary surface treating apparatus for carrying out a desired electroplating to a treatment object, the rotary surface treating apparatus comprising:

a surface treatment part for carrying out electroplating by energizing between an anode provided to a central part of a treatment container and a cathode arranged in a direction of the periphery of the container under the condition of shifting the object in a direction of the periphery of the container while outflowing surface treatment solution by rotating the container holding the surface treatment solution and the treatment object therein; and a control part having a storage part for storing a plurality of operating condition parameters, and programed to control the surface treatment part based on the operating condition parameters stored in the storage part;

wherein the operating condition parameters stored in the storage part include a plurality of liquid parameters and an energization parameter;

wherein the plurality of liquid parameters are set as a first operating condition according to a result of a preliminary test operation, the control part programmed to carry out a first test operation through control of the surface treatment part under the plurality of liquid parameters set as the first operating condition with no energization being carried out, wherein one of the liquid parameters includes a constant rotation period, wherein the constant rotation period includes a plating delay period and a plating period, wherein the plurality of liquid parameters and the energization parameter are set as a second operating condition determined based upon a result of the first test operation, so that no energization is to be carried out during the plating delay period, and energization is to be carried out during the plating period, the control part programmed to carry out a second test operation using the second operating condition under the condition that energization is carried out as set according to the second operating condition, and wherein an optimum operating condition is selected according to a result of the second test operation and is registered to the storage part.

10. An operating condition determination computer program stored on a non-transitory computer readable medium, the computer program comprising computer readable instructions for a computer to perform certain steps of using a rotary surface treating apparatus for carrying out a desired electroplating to a treatment object, the rotary surface treating apparatus includes a surface treatment part for carrying out electroplating by energizing between an anode provided to a central part of a treatment container and a cathode arranged in a direction of the periphery of the container under the condition of shifting the object in a direction of the periphery of the container while outflowing surface treatment solution by rotating the container holding the surface treatment solution and the treatment object therein, and a control part having a storage part for storing a plurality of operating condition parameters, and controlling the surface treatment part based on the operating condition parameters stored in the storage part, wherein the certain steps of the operating condition determination computer program comprises the steps of:

carrying out a first test operation by the control part through control of the surface treatment part under the condition of a first operating condition adjusting a liquid parameter in accordance with an inputted operating condition or a previously stored operating condition in the storage part, wherein the liquid parameter includes a constant rotation period, wherein the constant rotation period includes a plating delay period and a plating period;

performing a second test operation by the control part under a condition that energization is carried out utilizing a second operating condition adding an energization parameter in the second test operation according to the result of the first test operation;

wherein the carrying out the first test operation by the control part through control of the surface treatment part under the plurality of liquid parameters set as the first operating condition occurs with no energization being carried out;

setting the plurality of liquid parameters and the energization parameter as the second operating condition determined based upon a result of the first test operation, so that no energization is to be carried out during the plating delay period, and energization is to be carried out during the plating period, and carrying out the second test operation by the control part using the second operating condition with the energization being carried out as set according to the second operating condition; and carrying out registration of an operating condition that is selected as an optimum operating condition according to the result of the second test operation to the storage part.

* * * * *